(12) United States Patent
Quaresma et al.

(10) Patent No.: US 11,824,938 B1
(45) Date of Patent: Nov. 21, 2023

(54) EXTERNAL SENSOR INTEGRATION AT EDGE DEVICE FOR DELIVERY OF DATA TO INTAKE SYSTEM

(71) Applicant: SPLUNK Inc., San Francisco, CA (US)

(72) Inventors: Rodrigo Paulo Quaresma, Burlington (CA); Neel Mehta, Toronto (CA); Warren Shum, Mississauga (CA); William Huang, Vaughan (CA); Jonathan Yeung, Mississauga (CA); Yi Chien Lee, Oakville (CA); Masrur Mahmood, Mississauga (CA); Anthony Ng, Toronto (CA); Allyson Aberg, Toronto (CA); Qi Shu, Newmarket (CA); Neha Kumari, Richmond Hill (CA); Joel Jacob, Etobicoke (CA)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/976,676

(22) Filed: Oct. 28, 2022

(51) Int. Cl.
*H04L 67/12* (2022.01)
*H04L 67/63* (2022.01)

(52) U.S. Cl.
CPC .............. *H04L 67/12* (2013.01); *H04L 67/63* (2022.05)

(58) Field of Classification Search
CPC ................................ H04L 67/12; H04L 67/63
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,141,105 B2 * | 3/2012 | Roberts | G06Q 10/10 719/318 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,007,513 B2 * | 6/2018 | Malladi | G06F 8/70 |

(Continued)

OTHER PUBLICATIONS

Splunk Enterprise 8.0.0 Overview, available online, retrieved May 20, 2020 from docs.splunk.com.

(Continued)

*Primary Examiner* — David R Lazaro
(74) *Attorney, Agent, or Firm* — KILPATRICK TOWNSEND & STOCKTON LLP

(57) ABSTRACT

Described herein are techniques for integrating external sensors to an edge device, such as for ingesting data into a data intake and query system. The edge device has an internal message broker for communicating with internal (e.g., preconfigured, recognized) sensors, and an external message broker for communicating with external (e.g., customer-configured, otherwise unrecognized) sensors. The external message broker provides access to customer configuration of external sensors, but is logically quarantined from the internal message broker to prevent unwanted customer access to internal configurations. The internal and external message brokers interface only via a bridging service that transforms external sensor data into data based on customer-configurable transformations. The transformed data can be handled by the edge device and/or downstream components (e.g., a data intake and query system) in the same manner as internal sensor data.

41 Claims, 11 Drawing Sheets

(56) References Cited

U.S. PATENT DOCUMENTS

| | | | |
|---|---|---|---|
| 10,127,258 B2 | 11/2018 | Lamas et al. | |
| 2017/0060574 A1* | 3/2017 | Malladi | H04W 4/38 |
| 2017/0351241 A1* | 12/2017 | Bowers | G05B 13/048 |
| 2018/0300124 A1* | 10/2018 | Malladi | H04L 67/561 |
| 2018/0338019 A1* | 11/2018 | Wagstaff | H04L 69/02 |
| 2019/0098106 A1 | 3/2019 | Mungel et al. | |
| 2019/0334993 A1* | 10/2019 | Gkoufas | H04L 67/10 |
| 2020/0327371 A1* | 10/2020 | Sharma | H04L 67/34 |
| 2021/0006636 A1* | 1/2021 | Koehler | H04L 41/0806 |
| 2022/0156704 A1* | 5/2022 | Shaw | G06Q 10/06395 |
| 2022/0217211 A1* | 7/2022 | Scarfutti | G06F 16/9024 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

400

Sample Message  REFRESH

```
{ [ - ]
    data: { [ - ]
        payload: { [ - ]
            /iolinkmaster/port[1]/iolinkdevice/pdin: { [ - ]
                data: "0000FC000001FF000000FF000162FF000032FF03"
            }
        }
    }
}
```
410

Value ⓘ data.payload.*/iolinkmaster/port[1]/iolinkdevice/pdin*.data
420

430
Transformation Result

EXTERNAL SENSOR INTEGRATION AT EDGE DEVICE FOR DELIVERY OF DATA TO INTAKE SYSTEM

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to collecting, managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing. Collecting and storing massive quantities of minimally processed or unprocessed data for later retrieval and analysis is becoming increasingly more feasible as new techniques are developed.

BRIEF DESCRIPTION OF THE DRAWINGS

Illustrative examples are described in detail below with reference to the following figures:

FIG. 4 shows an example portion of a user interface accessible via an illustrative customer portal.

DETAILED DESCRIPTION

Figure 1:
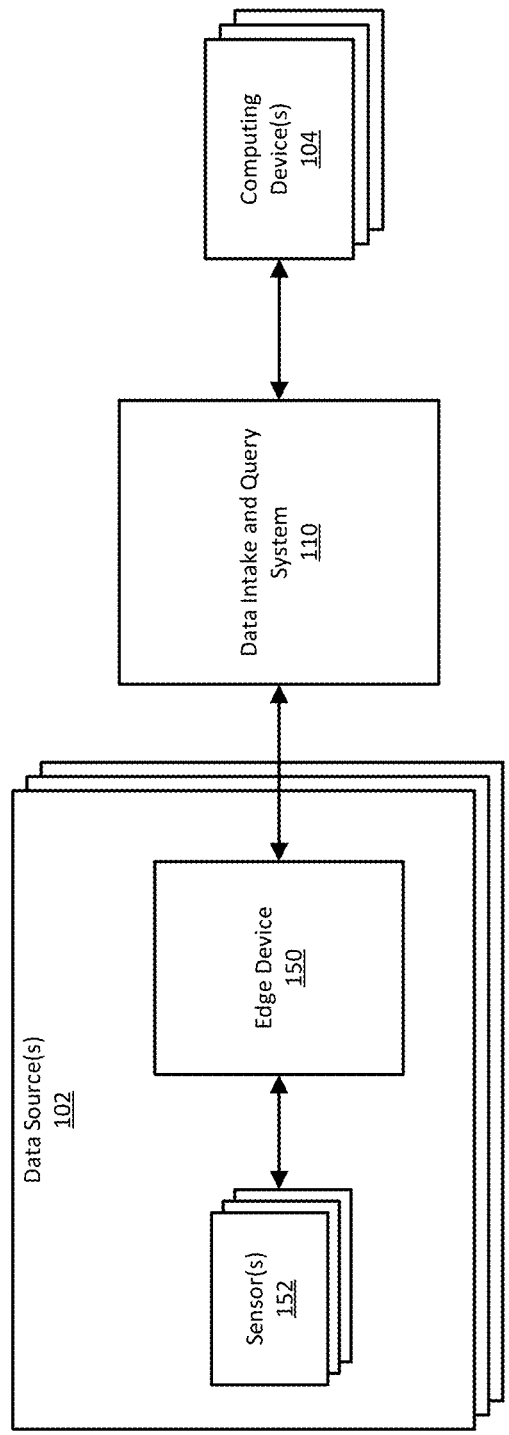
FIG. 1 illustrates a block diagram of an example data processing environment.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of techniques are used to collect and analyze machine data. For example, edge devices coupled with sensors can be deployed within the IT environment to collect machine data and send the machine data to a data intake and query system. In such configurations, the edge devices and sensors function as data sources for the data intake and query system. The system may then parse the machine data to produce events each having a portion of machine data associated with a timestamp, and then store the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

Sources of the machine data can include internal and/or external sensors of the edge devices. As used herein, the terms "internal sensor" and "external sensor" are intended to indicate the relationship between the sensor and the edge device receiving its machine data; and not, for example, the physical location of the sensor. An edge device can be internally configured to recognize particular sensors (so-called "internal sensors"), such that the edge device knows what types of machine data are provided by internal sensors and what data formats are used by internal sensors to communicate those types of machine data. Any other sensors are considered "external sensors" with respect to the edge device. As described herein, an edge device can be customer-configurable to communicate with "external sensors." Even though the edge device may not recognize or have an internal configuration for the external sensor, the edge device can be customer-configured to transform machine data from the external sensor into data that is usable by downstream components (e.g., for searching and indexing).

The internal sensors can be implemented physically within the edge device, or physically outside the edge device and in communication with the edge device via wired and/or wireless communication links. External sensors are implemented physically outside the edge device and in communication with the edge device via wired and/or wireless communication links. In some cases, internal sensors and/or external sensors communicate with the edge devices via an intermediary, such as an appliance that receives machine data from multiple internal and/or external sensors (e.g., physically within the appliance, or coupled with the appliance) and transmits the received data to an edge device. In some cases, a combination of the appliance with one or more sensors acts as an internal sensor. For example, one or more sensor components are plugged into the appliance; even though the edge device may not know how to communicate with the sensor component, the edge device knows how to communicate with the appliance, such that the combination of the sensor components and the appliance functions as an internal sensor with respect to the edge device.

At the edge device, typically a number of services are run to manage the movement of the machine data as it is captured by the sensors and is transmitted by the edge device to the data intake and query system. In some instances, the services may communicate with each other as well as with the sensors using a particular messaging protocol. In some cases, sensors and/or services can communicate using one or more conventional messaging protocols. In other cases, sensors and/or services can communicate using proprietary messaging protocols and/or messaging procedures developed for the edge device to enable efficient delivery of data to a data intake and query system. Some such messaging procedures and messaging protocols are described in U.S. patent application Ser. No. 17/733,176, titled "Messaging Procedure at Edge Device for Delivery of Data to Intake System," filed on Apr. 29, 2022, which is incorporated herein in its entirety. For example, the edge device may include a system memory that has instructions stored therein for executing a message broker and a set of services. The message broker provides communication between a number of clients, which include the services running on the edge device as well as one or more sensors coupled to the edge device. The message broker may implement a topic-based publish-subscribe protocol in which messages are published by clients to certain topics and published messages are delivered to the clients that are subscribed to those topics. Each client may subscribe to one or more of the topics and the message broker may track these subscriptions by maintaining and updating a list of subscriptions. In some examples, the Message Queuing Telemetry Transport (MQTT) protocol is used to implement message brokers described herein.

In some examples, a configuration file that contains configuration data may be loaded onto the edge device after it is received from an external sender. The configuration data, which may be unpackaged by a data streamer service running on the edge device, may indicate which topics the data streamer service is to subscribe to and may further provide other instructions for modifying the operation of other services and sensors. In one example, the configuration data may include a request for anomaly data associated with a particular type of sensor data, and accordingly the data streamer service may subscribe to a topic for detected anomalies and an anomaly detection service may subscribe to a topic for that particular type of sensor data. Thereafter, the data streamer service may begin receiving published messages from the anomaly detection service that indicate whether an anomaly has been detected.

In another example, the configuration data may include a request for a particular type of sensor data and a particular measurement rate for that type of sensor data (e.g., a request for temperature measurements at 0.5 Hz), and accordingly the data streamer service may subscribe to a topic for that particular type of sensor data and may further send a message to the sensor(s) to make measurements at the particular measurement rate. After subscribing to the topic for the particular type of sensor data, the data streamer service may begin receiving published messages that include sensor data and measurements for the particular type of sensor data. The sensor data may then be sent in the form of output data from the data streamer service to the data intake and query system or to some other external recipient over one or more networks.

In some examples described herein, the message broker described above is referred to as an "internal message broker" of the edge device, and the internal message broker facilitates communications between the edge device and internal sensors via "internal topics." The internal topics can be used for receiving internal sensor data and also for other purposes, such as for overall device configuration, network configuration, registration status, etc. The internal message broker is internally facing (i.e., proprietary) to the edge device, such that internal topics of the internal message broker cannot be created or edited by messaging from external senders, via a user interface of the edge device, etc. As described above, a configuration file can be externally modified to update which customers are subscribed to which internal topics, how frequently certain internal sensor data is received by the internal topics, etc. However, customers cannot alter the internal topics themselves. For example, the internal topic represents a fixed manner in which the edge device communicates with an associated internal sensor. In some cases, the topics of the internal message broker can only be updated, if at all, by authorized updates to proprietary firmware or software of the edge device, or otherwise by authorized individuals (not external customers).

As described herein, the edge device can further include an external message broker. The external message broker is externally facing (customer-facing) to allow customers to configure the edge device for communication with external sensors (end/or receipt of any other arbitrary external data). For example, customers can enable a write-only port on the edge hub by which an external sensor can communicate with the external message broker. The customer can further set up an external topic to associate raw machine data from the external sensors with the external message broker. The external topic can then receive what appears to be arbitrary raw machine data from the associated external sensor. Techniques described herein enable a single external sensor to communicate data to multiple external topics. Other techniques described herein enable multiple external sensors to communicate data to a single external topic.

The external message broker is logically quarantined from the internal message broker, such that the external message broker cannot communicate directly with the internal message broker. For example, external messaging cannot be used to edit, overwrite, or otherwise impact operation of internal topics. Instead, the external message broker can communicate with the internal message broker via a bridging service of the edge device. For each external topic set up on the external messaging broker, the customer further sets up external topic rules to be implemented by the bridging service to convert arbitrary raw machine data received by the external messaging hub into transformed machine data usable by the internal message broker. For example, the rules can include transforms to parse certain data from the raw machine data, perform operations on the data (e.g., Boolean operations, string operations, mathematical functions, etc.), or the like.

Thus, the bridging service provides a secure bridge between the customer-facing and internal-facing message brokers and associated topics. For example, an external sensor generates raw sensor data, which is received by the edge device via a write-only port. Based on previous configuration by a customer, the raw sensor data is received by an external topic of the external message broker. The raw sensor data is passed from the external message broker to the bridging service (e.g., via a subscription). The bridging service applies customer-defined external topic rules to transform the raw sensor data into transformed topic data usable by the internal message broker. The bridging service passes the transformed topic data to the internal message broker. The internal message broker can process the transformed topic data (e.g., in the same manner as for any internal topic data) into a processed sensor data stream. For example, anomaly detection can be performed on the transformed topic data. In other cases, the internal message broker does not perform any processing, but the transformed data output by the internal message broker is still referred to as a processed sensor data stream. The processed sensor data stream can be output by the edge device. For example, a data streaming service of the edge device can output the processed sensor data stream to one or more external computational systems via one or more communication networks, such as to a data intake and query system.

The figures herein follow a numbering convention in which the first digit or digits correspond to the figure number and the remaining digits identify an element or component in the figure. Similar elements or components between different figures may be identified by the use of similar digits. For example, 150 may reference element "50" in FIG. 1, and a similar element may be referenced as 250 in FIG. 2. As will be appreciated, elements shown in the various embodiments herein can be added, exchanged, and eliminated so as to provide a number of additional embodiments of the present disclosure.

FIG. 1 illustrates a block diagram of an example data processing environment 100. In the illustrated example, the data processing environment 100 includes one or more data sources 102, a data intake and query system 110, and one or more computing devices 104 (alternatively referred to as "client devices" or "client computing devices"). Each of the data sources 102 may include an edge device 150 that is communicatively coupled with one or more sensors 152. In some examples, the data processing environment 100 may be alternatively referred to as a "computing environment".

The data intake and query system 110, edge devices 150, and computing devices 104 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a computing device 104 can communicate with an edge device 150 via one or more networks. For example, if the edge device 150 is configured as a web server and the computing device 104 is a laptop, the laptop can communicate with the web server to view a website.

The computing devices 104 can correspond to distinct computing devices that can configure, manage, or sends queries to the system 110. Examples of the computing devices 104 may include, without limitation, smart phones, tablet computers, handheld computers, wearable devices, laptop computers, desktop computers, servers, portable media players, gaming devices, or other device that includes computer hardware (e.g., processors, non-transitory computer-readable media, etc.) and so forth. In certain cases, the computing devices 104 can include a hosted, virtualized, or containerized device, such as an isolated execution environment, that shares computing resources (e.g., processor, memory, etc.) of a particular machine with other isolated execution environments.

The computing devices 104 can interact with the system 110 and/or the edge devices 150 in a variety of ways. For example, the computing devices 104 can communicate with the system 110 and/or the edge devices 150 over an Internet (Web) protocol, via a gateway, via a command line interface, via a software developer kit (SDK), a standalone application, etc. As another example, the computing devices 104 can use one or more executable applications or programs to interface with the system 110.

The edge devices 150 can correspond to distinct computing devices or systems that include or have access to data that can be ingested, indexed, and/or searched by the system 110. The edge devices 150 can include, but are not limited to, servers, routers, personal computers, mobile devices, internet of things (JOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory computer-readable media, etc.). In some examples, the edge devices 150 may receive the data from the sensors 152 that is to be processed by the system 110. As such, each one of the edge devices 150 and its associated sensors 152 may constitute one of the data sources 102.

The types of data that are generated by each of the data sources 102 (and consequently by each of the edge devices 150) can include machine data such as, for example and without limitation, server log files, activity log files, configuration files, messages, network packet data, performance measurements, sensor measurements, etc. In some cases, one or more applications executing on the edge devices 150 may generate various types of machine data during operation. For example, a web server application executing on one of the edge devices 150 may generate one or more web server logs detailing interactions between the web server and any number of the computing devices 104 or other devices.

As another example, one of the edge devices 150 may be implemented as a router and may generate one or more router logs that record information related to network traffic managed by the router. As yet another example, a database server application executing on one of the edge devices 150 may generate one or more logs that record information related to requests sent from other devices (e.g., web servers, application servers, client devices, etc.) for data managed by the database server. Similarly, one of the edge devices 150 may generate and/or store computing resource utilization metrics, such as, but not limited to, CPU utilization, memory utilization, number of processes being executed, etc. Any one or any combination of the files or data generated in such cases can be used as a data source for the system 110.

As used herein, obtaining data from one of the data sources 102 may refer to communicating with one of the edge devices 150 to obtain data from the edge device 150 (e.g., from the sensors 152 associated with the edge device 150 or some other data streams or directories on the edge device 150, etc.). For example, obtaining data from one of the data sources 102 may refer to requesting data from one of the edge devices 150 and/or receiving data from the edge device 150. In some such cases, the edge device 150 can retrieve and return the requested data and/or the system 110 can retrieve the data from the edge device 150 (e.g., from a particular file stored on the edge device 150).

The data intake and query system 110 can ingest, index, and/or store data from heterogeneous data sources and/or edge devices 150. For example, the system 110 can ingest, index, and/or store any type of machine data, regardless of the form of the machine data or whether the machine data matches or is similar to other machine data ingested, indexed, and/or stored by the system 110. In some cases, the system 110 can generate events from the received data, group the events, and store the events in buckets. The system 110 can also search heterogeneous data that it has stored, or search data stored by other systems (e.g., other system 110 systems or other non-system 110 systems). For example, in response to received queries, the system 110 can assign one or more components to search events stored in the storage system or search data stored elsewhere.

As described herein in greater detail below, the system 110 can use one or more components to ingest, index, store, and/or search data. In some embodiments, the system 110 is implemented as a distributed system that uses multiple components to perform its various functions. For example, the system 110 can include any one or any combination of an intake system to ingest data, an indexing system to index the data, a storage system to store the data, and/or a query system (or search system) to search the data, etc. In some cases, the components of the system 110 are implemented as distinct computing devices having their own computer hardware (e.g., processors, non-transitory computer-readable media, etc.) and/or as distinct hosted devices (e.g., isolated execution environments) that share computing resources or hardware in a shared computing resource environment.

The intake system can receive data from the edge devices 150, perform one or more preliminary processing operations on the data, and communicate the data to the indexing system, query system, storage system, or to other systems (which may include, for example, data processing systems, telemetry systems, real-time analytics systems, data stores, databases, etc., any of which may be operated by an operator of the system 110 or a third party). Given the amount of data that can be ingested by the intake system, in some embodiments, the intake system can include multiple distributed computing devices or components working concurrently to ingest the data. The preliminary processing operations performed by the intake system can include, but is not limited to, associating metadata with the data received from the edge devices 150, extracting a timestamp from the data, identifying individual events within the data, extracting a subset of machine data for transmittal to the indexing system, enriching the data, etc.

In some environments, a user of a system 110 may install and configure, on computing devices owned and operated by the user, one or more software applications that implement some or all of the components of the system 110. For example, with reference to FIG. 1, a user may install a software application on server computers owned by the user and configure each server to operate as one or more components of the intake system, indexing system, query system, shared storage system, or other components of the system 110. This arrangement generally may be referred to as an "on-premises" solution. That is, the system 110 is installed and operates on computing devices directly controlled by the user of the system 110. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 110 operate.

In certain examples, one or more of the components of the system 110 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 110 by managing computing resources configured to implement various aspects of the system and by providing access to the system to end users via a network. Typically, a user may pay a subscription or other fee to use such a service. Each subscribing user of the cloud-based service may be provided with an account that enables the user to configure a customized cloud-based system based on the user's preferences.

Implementing the system 110 in a shared computing resource environment can provide a number of benefits. In some cases, implementing the system 110 in a shared computing resource environment can make it easier to install, maintain, and update the components of the system 110. For example, rather than accessing designated hardware at a particular location to install or provide a component of the system 110, a component can be remotely instantiated or updated as desired. Similarly, implementing the system 110 in a shared computing resource environment or as a cloud-based service can make it easier to meet dynamic demand. For example, if the system 110 experiences significant load at indexing or search, additional compute resources can be deployed to process the additional data or queries. In an "on-premises" environment, this type of flexibility and scalability may not be possible or feasible.

Figure 2:
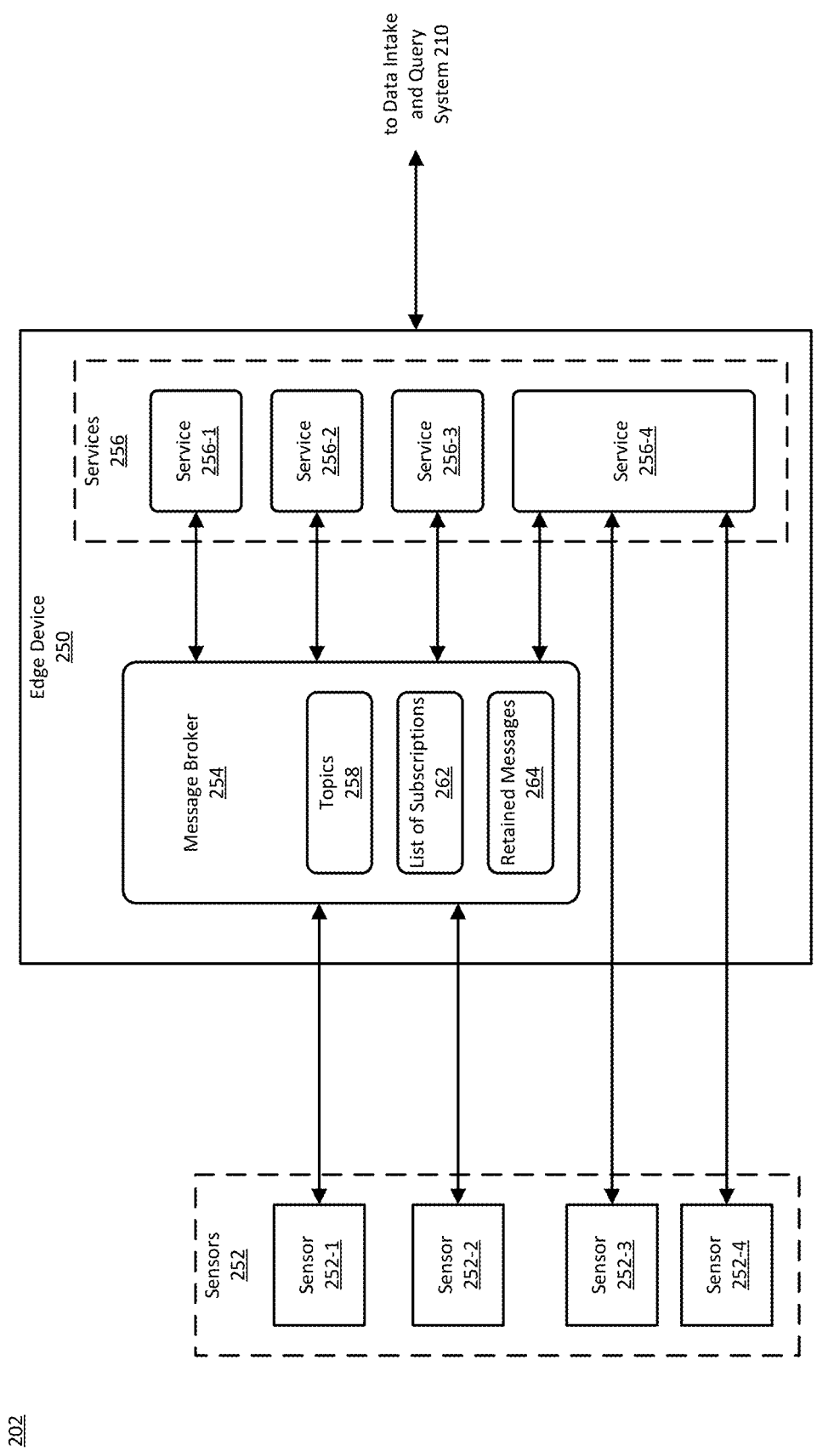
FIG. 2 illustrates a block diagram of an example data source.

FIG. 2 illustrates a block diagram of an example data source 202. In the illustrated example, the data source 202 includes an edge device 250 that is communicatively coupled to a set of sensors 252. The edge device 250 may include various hardware elements and software application programs that may be used by the hardware elements. For example, the edge device 250 may include a message broker 254 and a set of services 256 that are configured to run on the edge device 250. For example, instructions for executing the message broker 254 and the services 256 may be stored on the system memory of the edge device 250 and, upon startup of the edge device 250, these instructions may be sequentially loaded into one or more processors of the edge device 250 so that these programs are caused to run on the edge device 250 to carry out the functionalities described below. In some examples, the edge device 250 is physically installed at an edge of a network of computational devices. For example, the edge device 250 is a physical "box" with a housing configured to be installed in a data center, on an equipment rack, on an equipment shelf, or the like.

The message broker 254 is executed by the edge device 250 to provide communication between the various software and hardware entities within the data processing environment. For example, the message broker 254 may receive and send messages between several clients in accordance with a publish-subscribe network protocol. In some examples, the message broker 254 may implement a topic-based publish-subscribe protocol in which messages are published by clients on certain topics and the published messages are delivered by the message broker 254 to the clients that are subscribed to those topics. In one example, the message broker 254 is implemented according to the MQTT protocol. In other examples, the message broker 254 is implemented according to any suitable publish-subscribe-type of messaging protocol. Clients may subscribe to one or more topics and the message broker 254 may track these subscriptions by maintaining a list of each subscription.

The message broker 254 may directly or indirectly communicate with a number of clients, which may include one or more of the sensors 252 and one or more of the services 256. Each of the clients may subscribe to one of a number of topics 258 that are maintained by the message broker 254. The topics 258 may be a file or data structure that is prepopulated with the possible topics to which a client may subscribe or, in some examples, the topics 258 may be updated over time. For example, additional topics may be added to the topics 258 once the topic is first subscribed or published to, and topics may be removed from the topics 258 once the last client unsubscribes from the topic.

The message broker 254 may maintain a list of subscriptions 262 to track the client subscriptions. In general, the list of subscriptions 262 may include one or more subscriptions that indicate which of the set of clients are subscribed to which of the topics 258. The list of subscriptions 262 may be a file or data structure that is prepopulated with the subscriptions or, in some examples, is updated over time by, for example, adding a subscription each time a client subscribes to a topic to which the client was not previously subscribed, and removing a subscription each time a client unsubscribes from a topic. As described above, a client may subscribe to a topic that is previously listed in the topics 258 or is a new topic that may then be added to the topics 258.

In some examples, the message broker 254 may maintain a set of retained messages 264 that includes recent published messages received by the message broker 254. In some examples, the retained messages 264 may be used to allow newly-subscribed clients to a topic to receive messages that were published prior to the clients being subscribed. In some examples, the publish-subscribe protocol may not require that at least one client must first be subscribed to a particular topic before any message can be published to that topic, and therefore a client that publishes a message has no guarantee that a subscribing client actually receives the message. By maintaining the retained messages 264, clients may receive messages that they would otherwise have missed and, furthermore, a published message may be more likely to be received by a desired recipient. In various examples, the retained messages 264 may store the N most recent published messages, all messages published within the last T amount of time, or the N most recent published messages received within the last T amount of time, among other possibilities.

As noted above, clients of the message broker 254 may include any of the sensors 252 and any of the services 256. In various examples, one or more of the sensors 252 may be clients of the message broker 254 via direct communication with the message broker 254 or via one of the services 256 that may act as an intermediary between the message broker 254 and the sensors 252. For example, in the illustrated embodiment, the sensors 252-1 and 252-2 may be clients of and may communicate directly with the message broker 254, while the sensors 252-3 and 252-4 may be clients of the message broker 254 and may communicate via service 256-4, which may act as a sensor manager service that causes a connected sensor to perform various actions that change the operation of the connected sensor (e.g., turn on/off the sensor, increase/decrease the rate that sensor data is captured or transmitted).

Further in the illustrated example, the services 256-1, 256-2, and 256-3 may be clients of the message broker 254 and may communicate directly with the message broker (e.g., by virtue of being executed on the same hardware). The services 256 may publish messages on certain topics and subscribe to certain topics so as to receive messages published to those topics. One or more of the services 256 may communicate with a data intake and query system 210 by, for example, receiving requests from the system 210 to subscribe to certain topics that the system 210 is interested in, and transmit messages published on those topics to the system 210.

The sensors 252 may include one or more of a variety of sensor types such as, without limitation, a light sensor, an image capture sensor, a sound sensor, a vibration sensor, an accelerometer, a gyroscope, a pressure sensor, a humidity sensor, a gas sensor, a location sensor, among other possibilities. The illustrated sensors 252 can be physically disposed internal to, and/or external to the edge device 250. For example, the sensors 252 may include an internally disposed vibration sensor and/or an externally disposed vibration sensor that provide vibration measurements within the edge device 250 and of the external environment, respectively. Externally disposed sensors may provide measurement data corresponding to a target device that is located within the data processing environment, such as a server computer, to which one or more of the sensors 252 are attached.

The illustrated message broker 254 is of the type referred to herein as an "internal message broker", and the illustrated sensors 252 are of the type referred to herein as "internal sensors." Regardless of the physical locations of these sensors 252 (i.e., whether physically disposed internally or externally with respect to the edge device 250), the sensors 252 are considered as internal sensors because the message broker 254 (internal message broker) of the edge device 250 is pre-configured (e.g., out of the box, based on firmware, etc.) to obtain and recognize raw sensor data from those sensors 252 without any further configuration by customers. In contrast, "external" sensors (as used herein) and their data are not recognizable to the message broker 254 without further configuration. For example, raw sensor data received from an external sensor may not be associable with any topics 258 or services 256, and/or may appear to the edge device 250 as an arbitrary stream of bits.

Figure 3:
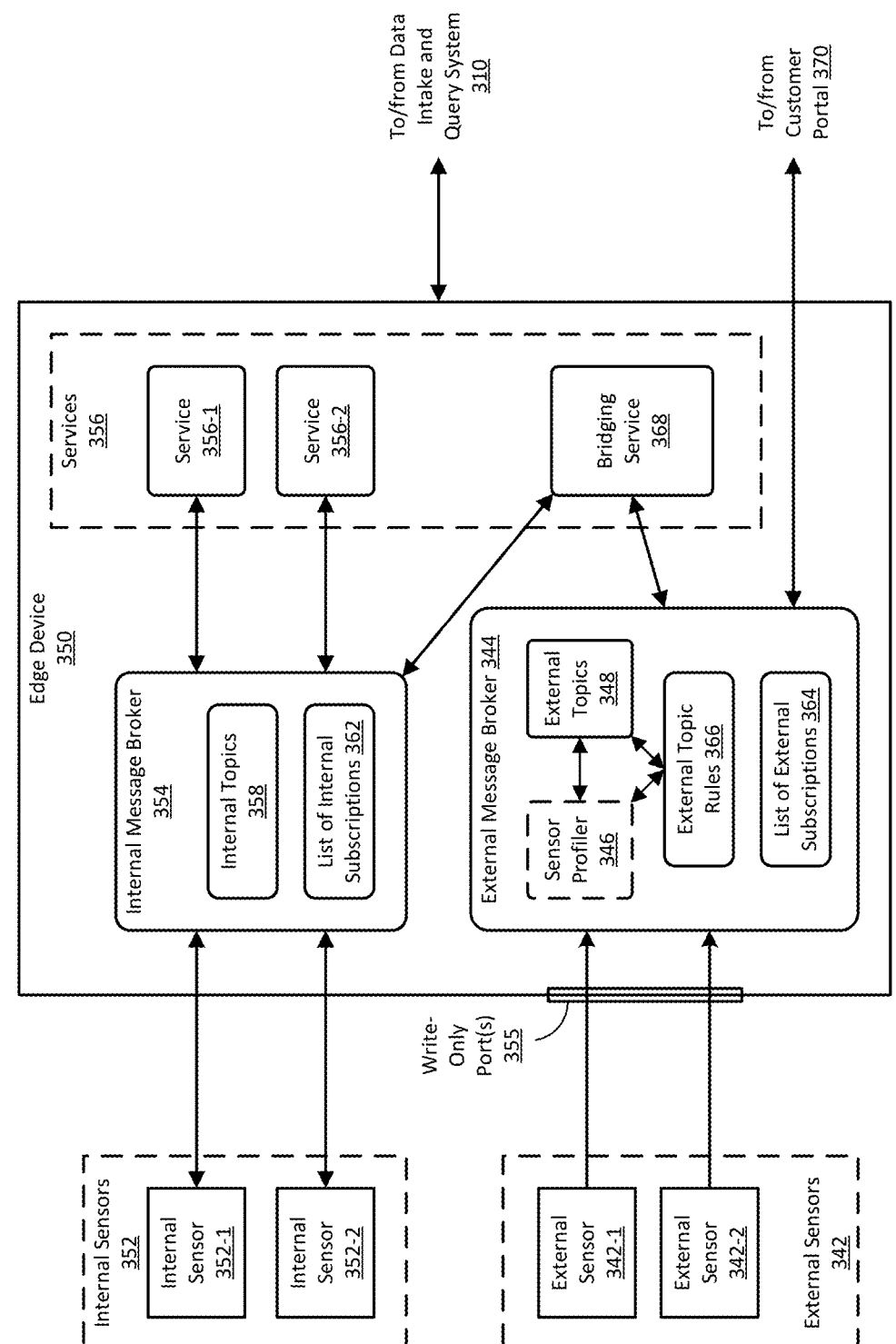
FIG. 3 illustrates a block diagram of another example data source.

FIG. 3 illustrates a block diagram of another example data source 302. In the illustrated example, the data source 302 includes an edge device 350 that is communicatively coupled to a set of internal sensors 352 and a set of external sensors 342. Except as otherwise described, the edge device 350 may operate in the same manner as the edge device 250 of FIG. 2 and/or the edge device 150 of FIG. 1. For example, the internal sensors 352, the internal message broker 354, and some of the services 356 can be implementations of the sensors 252, the message broker 254, and the services 256 of FIG. 2. In the data source 302 of FIG. 3, the internal sensors 352 communicate with an internal message broker 354, the external sensors 342 communicate with an external message broker 344, and the external message broker 344 communicates with the internal message broker 354 only via a bridging service 368.

The internal message broker 354 and the external message broker 344 are both executed by the edge device 350 to provide communication between the various software and hardware entities within the data processing environment. Both the internal message broker 354 and the external message broker 344 may receive and send messages between clients in accordance with a publish-subscribe network protocol. As described above, such a protocol may use a topic-based approach in which clients subscribe to one or more topics, subscribed clients can publish messages on those topics, and the published messages are delivered by the message brokers to the subscribed clients.

The internal message broker 354 may directly or indirectly communicate with a number of internal clients, which may include one or more of the internal sensors 352 and one or more of the services 356. The edge device 350 may include a proprietary configuration that is provided and/or updated by an entity with proprietary access to the edge device 350. For example, the proprietary configuration is an out-of-the box configuration, a firmware configuration, a hard-coded configuration, etc. In the proprietary configuration, the internal message broker 354 may include preconfigured internal topics 358 for receiving raw sensor data from internal sensors 352. The internal sensors 352 can subscribe to those internal topics 358, thereby being able to pass raw sensor data to the internal message broker 354. As described with reference to FIG. 2, although the internal sensors 352 are shown as in direct communication with the internal message broker 354, some internal sensors 352 may be in communication with the internal message broker 354 via a particular service (e.g., service 256-4 of FIG. 2). For example, the internal message broker 354 is preconfigured with rules, protocols, etc. tailored to receive, parse, operate on, and/or otherwise process raw sensor data received from one or more types of internal sensors 352. The topics and some or all related pre-configurations of the internal message broker 354 may not be accessible to customers. For example, customers may be restricted from accessing (e.g., editing, adding, removing, etc.) internal topics and some or all internal preconfigurations relating to those topics. As used herein, the term "customer" is intended to assume any end user that does not have access to the proprietary configuration of the edge device 350.

The external message broker 344 may directly or indirectly communicate with a number of external clients, which may include one or more of the external sensors 342 and at least the bridging service 368. The external message broker 344 may be part of an initial configuration of the edge device 350 but is not considered part of the proprietary configuration. Rather, the external message broker 344 is configured to be accessed by customers via one or more customer portals 370. For example, FIG. 3 shows a communication link between the external message broker 344 and a customer portal 370. The customer portal 370 may communicate with the external message broker 344 in any suitable manner. In one example, the customer portal 370 is accessed via a user interface integrated with the edge device 350, such as an integrated touchscreen display, integrated keyboard, etc. In another example, the customer portal 370 is implemented on a customer device, such as an enterprise desktop computer, laptop computer, smart phone, tablet computer, etc.

The external message broker 344 is customer-configurable to receive data from external sensors 342 that are not recognized by the internal message broker 354. Such customer configuration is implemented by setting up external topics 348 and subscribing the external sensors 342 to the external topics 348. In some cases, multiple external sensors 342 subscribe to a single external topic 348. In some cases, a single external sensor 342 subscribes to multiple external topics 348. Such subscription allows the internal message broker 354 to receive raw sensor data from external sensors 342 in a manner that associates the received raw sensor data with the external sensor(s) 342 from which the data is received. The external message broker 344 may be configured to receive any arbitrary data, including raw sensor data of any arbitrary data format or type (e.g., any arbitrary stream of digital data).

During operation, the edge device 350 may receive first messaging from the customer portal 370 that requests creation of an external topic 348 in the external message broker 344 running on the edge device 350. As described herein, the external topic 348 is to receive raw external sensor data from at least one external sensor 342 via a port 355 of the edge device 350. In some cases, the port 355 is configured as a write-only port. As illustrated, the same edge device 350 also has, running thereon, the internal message broker 354 and the bridging service 368. The internal message broker 354 includes several internal topics 358. Each internal topic 358 is pre-configured to receive raw internal sensor data from one or more internal sensors 352, and those internal topics 358 are not accessible to the external message broker 344 and are not accessible to (i.e., cannot be written to or modified by) the customer portal 370.

Responsive to the first messaging, the external message broker 344 may instantiate the requested external topic 348. In some cases, the external topic 348 is instantiated as a generic topic (e.g., according to a default configuration) of the external message broker 344 configured to receive an arbitrary bit stream via the designated port 355. As described below, the external topic 348 can then be customer configured as desired. The bridging service 368 may then be subscribed to the external topic 348. For example, part of the instantiation is that the external topic 348 is created, and a list of external subscriptions 364 is automatically updated to subscribe the bridging service 368 to the external topic 348. The bridging service 368 is also subscribed to a designated one of the internal topics 358.

In some examples, the bridging service 368 is subscribed to the designated internal topic 358 as part of instantiating the external topic 348. In such examples, the designated internal topic 358 can have a one-to-one correspondence with the external topic 348. For example, raw sensor data received via each external topic 348 (or each transformed data stream coming from one or more external topics 348) is received via the bridging service 368 by a respective designated internal topic 358. In other examples, the bridging service 368 is pre-subscribed (i.e., before instantiating the external topic 348) to the designated internal topic 358, or the bridging service 368 is subscribed to the designated internal topic 358 whenever a first external topic 348 is instantiated in the edge device 350. In such examples, a same designated internal topic 358 can be used for any and all external topics 348 instantiated in the external message broker 344. For example, raw sensor data received via all external topics 348 is received via the bridging service 368 by a same respective designated internal topic 358 (e.g., with metadata, tags, etc. to facilitate differentiation between different data streams, as needed).

In general, the external sensor 342 may act as an agnostic proxy broker that can receive any arbitrary data from any arbitrary external sensor 342, and can provide for customer configuration of transforms, etc., but is logically isolated from affecting the internal message broker 354 (including all internal topics 358, internal sensors 352, internal subscriptions 362, services 356, etc.). Customer-configuration of transforms and/or other rules allows the bridging service 368 to securely provide the external sensor data to the internal message broker 354 in such a manner that the data appears to the internal message broker 354 (or is otherwise usable by the internal message broker 354) as if the data came from an internal sensor 352 (known, recognizable sensor data). The edge device 350 can then treat sensor data streams received from external sensors 342 in the same manner as it does with sensor data streams received from internal sensors 352 without providing customers with any ability to modify, delete, or otherwise affect the internal message broker 354. For example, data streaming services, anomaly detection services, etc. can be applied to the external sensor data streams, while maintaining isolation between those services 356 and any customer portal 370, or other customer access.

In some implementations, the customer portal 370 provides various user interface controls and options, such as via a graphical user interface (GUI). Some implementations of the interface include an advanced configuration section, which can used to enable customer access to the external message broker 344. Via the user interface (e.g., in the advanced configuration section of the interface), a customer can create and/or configure external topics 348. Creating a new external topic 348 instantiates the external topic 348 in the external message broker 344. As described above, such instantiation can set up the external topic 348 to be able to begin receiving arbitrary streams of data via the port 355, including to begin receiving a stream of raw external sensor data from an external sensor 342 (appearing as an arbitrary stream prior to further configuration).

The user interface on the customer portal 370 can then be used to configure the external topic 348 with one or more external topic rules 366. In some implementations, the external topic rules 366 include one or more timestamp rules, dimension rules, and/or metric rules. A timestamp rule can be configured to add a timestamp to the stream of raw external sensor data as it is received. A metric rule can be configured to transform or query the stream of raw external sensor data as it is received. Dimension rules can be configured to define parsing out of the stream into arbitrary fields. For example, the dimension rules can effectively convert the arbitrary stream of raw external sensor data into a sequence of key value pairs.

FIG. 4 shows an example portion of a user interface 400 accessible via an illustrative customer portal 370. For example, the edge device 350 or other intermediate network node includes a web-enabled user interface (webUI) via which the customer portal 370 can access a read-only internal message broker 354 and configure the external topics 348 (e.g., and to configure the external topic rules 366). The example portion of the illustrated user interface 400 may be part of an advanced configuration feature that enables a customer to configure dimension rules for transforming the raw external sensor data into a transformed sensor data stream having key value pairs recognizable by the internal message broker 354 (e.g., and by downstream components, such as a data intake and query system 310). The illustrated user interface 400 includes a first input region 410 in which the customer may define how to parse a field (e.g., key) from the incoming raw external sensor data, a second input region 420 in which the customer may define how to parse the value associated with that field in the incoming raw external sensor data, and an output region 430 that displays a sample transformation result from applying the key and value definitions. Once saved as part of the external topic rules 366, the defined "value" in the second input region 420 can be used to extract recognizable, usable "data" from the otherwise arbitrary payload being provided by the external sensor 342. Whenever the edge device 350 receives a message from the external sensor 342, the bridging service 368 can apply the transformation as defined by the external topic rules 366, and resulting data can be output from the edge device 350 (e.g., via the internal message broker 354 and a data streaming service of the services 356) as an ingestible key value pair.

The illustrated example assumes that definitions are in accordance with standard Javascript Object Notation (JSON), and transforms can be defined using a compatible programming language, such as JSONata. In other examples, any suitable programming language can be used. Although the example in FIG. 4 shows a simple transformation that parses a value out of the stream of data, the transformation can be defined with any level of complexity supported by the programming language. For example, JSONata allows for configuration of transformations that include summation, Boolean logic, string processing, conversion from a string to a number, etc.). As one example, the "value" input in the second input region 420 can be defined as follows:

'$number($substring(data.payload.*/iolinkmaster/port
  [1]/iolinkdevice/pdin*.data, 0, 2))'

With the illustrated field definition of input region 410, such a value definition may yield a transformation result in output region 430 of '0'. The transformation result in the output region 430 is effectively a preview of what the message will look like after the transformation is applied to a payload being received from an external sensor 342. Implementations can support the customer creating and configuring any desired number of transformations to apply to a stream of raw external sensor data.

Returning to FIG. 3, some examples described above assume that the edge device 350 has no way of determining anything about a new external sensor 342 for which no external topic 348 has been created or configured by a customer. In such examples, the initial configuration is considered as a "default" configuration by which the raw external sensor data may initially appear to the edge device 350 as completely arbitrary, unrecognizable data. Rather than beginning with a default configuration, some examples can begin with a template configuration. For example, the simple network management protocol (SNMP) includes predefined protocols for communicating with certain types of devices, includes certain types of sensors. Some implementations of the customer portal (e.g., the advanced configuration portion) allow the customer to select a template configuration, such as a predefined SNMP protocol. Such a selection can allow the external topic 348 and/or one or more external topic rules 366 to be generated according to a particular template. For example, the external topic rules 366 can include stored templates of external topic rules 366. If the selected template is appropriate for the new external sensor 342, the edge device 350 will be able to begin receiving raw external sensor data from the external sensor 342 in a usable, recognizable manner without further configuration by the customer. In some cases, the customer may still desire to edit one or more of the template external topic rules 366, to create additional external topic rules 366 (e.g., additional transformations), etc.

Some examples provide for further automation of new external sensor 342 configuration. As illustrated, embodiments of the external message broker 344 can optionally include a sensor profiler 346 configured to attempt to recognize a newly connected external sensor 342. Some embodiments of the sensor profiler 346 are configured to detect whether a newly connected external sensor 342 was previously configured by a customer to have an associated external topic 348 and external topic rules 366 in the edge device 350.

Other embodiments of the sensor profiler 346 are configured to determine whether a newly connected external sensor 342 is compatible with a template configuration, as described above. For example, an external sensor 342 may be configured to perform a pairing or handshake routine when newly connected to a device, and the routine may communicate identification information from which the external sensor 342 can be identified (e.g., or profiled, etc.) by the edge device 350. Alternatively, raw external sensor data from the external sensor 342 can be communicated in a particular identifiable format. In such cases, the sensor profiler 346 can automatically select and apply an appropriate template configuration. In some such cases, anomaly detection, or the like, is used to validate whether transformations applied to the raw external sensor data based on the automatically selected template configuration result in meaningful output values.

Other embodiments of the sensor profiler 346 are configured with a machine learning engine to automatically generate an external topic 348 with appropriate external topic rules 366. Training data, including a large number of examples of raw external sensor data or different types, are provided to the machine learning engine, and supervised and/or unsupervised learning techniques are applied to the training data by which the machine learning engine effectively learns how to classify arbitrary raw external sensor data into information from which appropriate external topic rules 366 can be automatically created, selected, configured, and/or otherwise applied. Notably, even in cases where the edge device 350 is able to begin meaningful communication with a new sensor without any customer configuration, the new sensor is still considered as an external sensor 342. For example, a new sensor is an external sensor 342 even though the sensor profiler 346 can automatically select a template configuration, use machine learning automatically to generate a configuration, etc., so that the sensor is automatically recognizable to the edge device 350. Such sensors are considered external sensors 342 at least because the new sensor is still not part of the internal configuration of the internal message broker 354, and a new external topic 348 must still be created and configured (even if automatically) before the sensor can be used in a meaningful way by the edge device 350.

Once the customer-defined transformation is saved as part of the external topic rules 366, the defined "value" in the second input region 420 can be used to extract recognizable, usable "data" from the otherwise arbitrary payload being provided by the external sensor 342. Whenever the edge device 350 receives a message from the external sensor 342, the bridging service 368 can apply the transformation as defined by the external topic rules 366, and resulting data can be output from the edge device 350 (e.g., via the internal message broker 354 and a data streaming service of the services 356) as an ingestible key value pair. Other services 356 can be used with the transformed data stream in the same manner as with internal sensor data. For example, services 356 can be used to display the sensor readings on one or more user interface devices, to ingest the data into other computational platforms, to perform further transformations on the data, to update a back-end state of the sensor (e.g., a present connectivity status), etc. Further, additional processing can be performed by external computational systems after the data is streamed out of the edge device 350 to those computational systems. For example, as described herein, a data intake and query system 310 can be used to filter, sort, index, search, and/or otherwise process the sensor data.

In some environments, one or more end user (e.g., customer or administrator) devices can be used to monitor the internal sensors 352 and any connected external sensors 342. For example, a mobile application may be configured to run on an end user device to recognize present connectivity statuses of internal sensors 352 and external sensors 342, and/or to change configuration data of internal sensors 352 and external sensors 342 (e.g., to change how frequently sensor data is received from any particular sensor and/or output from the edge device 350, to toggle whether to perform anomaly detection on the sensor data, etc.). Such end user devices can be implemented as illustrated in FIG. 1, where the computing devices 104 access sensor data via the edge device 350 (or via the data intake and query system 110 and the edge device 150). Sequestration of the external message broker 344 from the internal message broker 354 and services 356 (i.e., with restricted bridging performed via the bridging service 368) allows a mobile application running on one of the computing devices 104 to perform the same types of features (e.g., recognize present connectivity statuses, change configuration data, etc.) regardless of whether the sensors are internally recognized internal sensors 352, or otherwise unrecognizable external sensors 342.

For example, recognition of present connectivity status includes monitoring a pipeline to detect whether a particular sensor is connected, and to auto-configure the edge device 350 when the sensor is connected (e.g., auto-configure based on pre-configurations for internal sensors 352, and auto-configure based on customer-configurations for external sensors 342). Once the sensor is detected, a dedicated service 356 can update a backend state associated with the sensor indicating at least that the sensor is presently connected (e.g., and configured, etc.). An end user device or other computational platform can then query the backend state to determine a present connectivity status of a particular sensor.

As described above, some implementations associate each internal sensor 352 with a respective internal topic 358 and each external sensor 342 with a respective external topic 348. For example, raw external sensor data from a particular external sensor 342 is received by the external message broker 344 via a particular external topic 348. The external topic 348 may be associated with one or more external topic rules 366 corresponding to one or more transformations. For example, each field or key and value configured via the customer portal 370 defines a particular transformation, which is stored in the external topic rules 366.

In some examples, multiple of a same type of sensor can be connected to the edge device 350. For example, in a data center environment, there may be multiple temperature sensors distributed around different regions of the center, and all may be sending data to the edge device 350. Although the raw external sensor data from each of those sensors may be received in the same format from the same type of sensor, it nonetheless may be important to differentiate between the data sources (e.g., to know which temperature readings correspond to which physical locations). In some such cases, such differentiation can be supported by generating timestamp rules for the topics. For example, raw external sensor data is received from different ones of the temperature sensors according to a schedule, and the received raw external sensor data is tagged with a timestamp as it is received; thus, the location associated with each temperature reading can be distinguished by the time it was received. In other such cases, such differentiation can be supported by generating identification rules for the topics. For example, each temperature sensor is associated with a particular identifier, and an external topic rule 366 is configured to tag raw external sensor data received from each temperature sensor with its corresponding identifier; thus, the location associated with each temperature reading can be distinguished by the identifier.

In other implementations, a single sensor (internal sensor 352 or external sensor 342) can be associated with multiple topics (internal topics 358 or external topics 348, respectively). In other implementations, multiple sensors can be associated with a single topic. For example, in an access control environment, sensors are set up to detect when people pass through a doorway, including a distance sensor mounted above the doorway (e.g., when a person walks under the sensor, the distance appreciably reduces) and a camera pointing at the doorway. Supposing both are external sensors 342, raw external sensor data from both feeds into a single external topic 348 configured with external topic rules 366. For example, the external topic rules 366 are configured so that data from the distance sensor indicating an object passing through the doorway triggers processing of image data from the camera to confirm that the object appears to be a person, and ultimately a single data point (e.g., a number) is output from the bridging service 368. In such implementations, although the sensor environment may be complex, the transformed sensor data can be generated at any useful level of complexity for subsequent processes (e.g., for anomaly detection, for streaming out, for downstream storage and/or querying, etc.).

As noted above, the internal sensors 352 and external sensors 342 can be in communication with the edge device 350 via wired and/or wireless communication links. In the case of wireless communications, any suitable type of wireless data communication links and associated protocols can be used to communicatively couple the sensors with communication ports of the edge device 350, including with the write-only ports 355. For example, an internal sensor 352 or an external sensor 342 can include a wireless fidelity (WiFi) transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the sensor to communicate with the edge device 350. Such wireless communication can provide several features. One feature is that wireless communications allow some or all of the sensors to be physically removed from the edge device 350, such as to facilitate sensing in locations removed from the edge device 350. Another feature is that wireless communications provide isolation between the environment of the sensor and the environment of the edge device 350. For example, an isolated sensor can have its own power source, its own electrical shielding, its own housing etc.; and the isolated sensor can experience its own temperature, humidity, radiofrequency interference, noise, vibration, and/or other environmental conditions different from those experienced by the edge device 350.

Figure 5A:
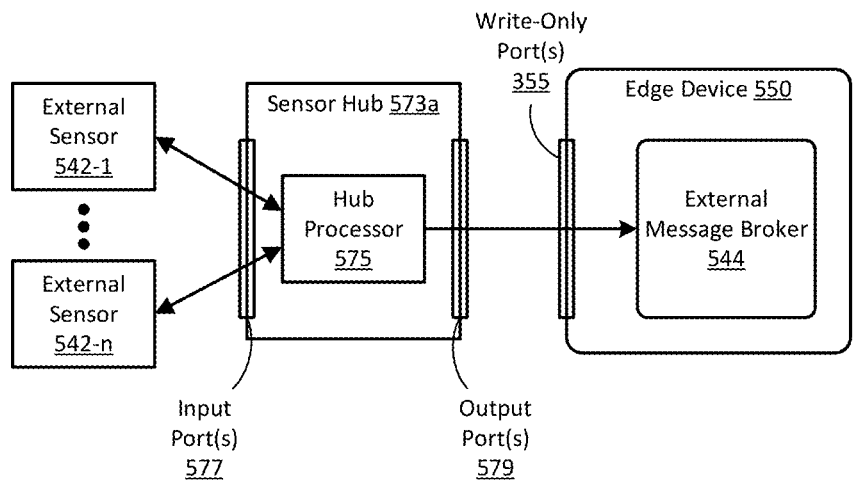
FIGS. 5A and 5B show architectures to provide additional manners of communicatively coupling external sensors with the edge device via a sensor hub.
Figure 5B:
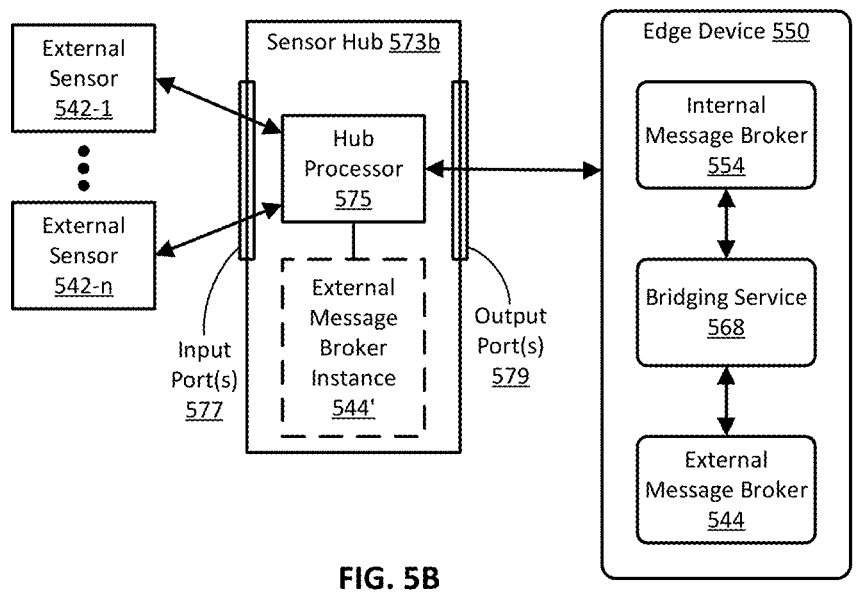

FIGS. 5A and 5B show architectures to provide additional manners of communicatively coupling external sensors 542 with the edge device 550 via a sensor hub 573. Turning first to FIG. 5A, a first example of a sensor hub 573a is shown including a hub processor 575. The hub processor 575 can be implemented in any suitable manner, such as by a central processing unit CPU, an application-specific integrated circuit (ASIC), an application-specific instruction-set processor (ASIP), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof.

One or more external sensors 542 are in communication with the sensor hub 573a via one or more input ports 577, and the sensor hub 573a is in communication with the external message broker 544 of the edge device 550 via one or more output ports 579 (and via write-only port(s) 355). The communication between the external sensor(s) 542 and the sensor hub 573a can be via wired or wireless communication links, and the communications between the sensor hub 573 and the edge device 550 can be via wired or wireless communication links. The hub processor 575 can effectively translate between the communications received at the input ports 577 into communications for transmission via the output ports 579. In some examples, one or more external sensors 542 are plugged into the sensor hub 573a, such that they communicate via wired communication links, but the sensor hub 573 communicates with the edge device 550 via a Bluetooth™ network, a WiFi network, or another suitable wireless communication link. In such cases, the hub processor 575 converts the raw external sensor data received via the wired communication link(s) into a suitable wireless signal for transmission via the wireless communication link(s) (e.g., by applying appropriate packet formatting, headers, preambles, postambles, modulation and/or coding schemes, and/or the like).

In some cases, the raw external sensor data is received as an analog signal, and the hub processor 575 converts the analog information into digital information for transmission to the edge device 550. As one example, a leak rope, current clamp monitor, or other custom or off-the-shelf sensor generates raw external sensor data as an analog signal, which it outputs via a cable terminating in a standard jack format (e.g., a headphone jack). The standard jack plugs into a physical input port 577 of the sensor hub 573a, the hub processor 575 converts the analog data into a packetized digital signal, and the hub processor 575 transmits the digital signal wirelessly to the edge device 550.

In some implementations, the sensor hub 573a is essentially a port extender. As one example, the edge device 550 itself may have a limited number of ports (e.g., write-only ports 355) by which to couple with internal sensors (not shown) and/or with external sensors 542. The sensor hub 573a can effectively permit multiple sensors to couple with a single port of the edge device 550 via multiple ports of the sensor hub 573a. As another example, the sensor hub 573a may be able to pair with the edge device 550, such as using Bluetooth™ pairing, or the like, thereby providing a communicative coupling between the edge device 550 and any sensors coupled with the sensor hub 573a. Several such sensor hubs 573a can be concurrently paired with the edge device 550 to provide additional ports, additional coupling flexibility, etc. The ability to wirelessly couple sensors (internal sensors and/or external sensors 542) with the edge device 550 provides various features, such as the ability to physically remove the sensors to locations away from the edge device 550, to provide the sensors with isolated environments (e.g., their own power, their own temperature, etc.), etc.

In some implementations, the sensor hub 573a is treated by the external message broker 544 as an external sensor 542. As one example, when the sensor hub 573a is first configured, a new external topic 548 is instantiated and external topic rules 566 are configured for receipt of raw external sensor data from the sensor hub 573a. As another example, the sensor hub 573a includes multiple output ports 579 coupled with multiple of the write-only ports 355 to establish multiple channels. The hub processor 575 is configured to send raw external sensor data coming from each connected external sensor 542 via a different channel, and each of those channels can be configured with its own respective external topic 548, external topic rules 566, etc. For example, in such a configuration, the sensor hub 573a may be similar to a router, or a switch fabric, and each external sensor 542 coupled with the sensor hub 573a can still be seen as a separate external sensor 542 by the external message broker 544. As another example, the hub processor 575 adds identifying information (e.g., an identifier, a header, a timestamp, etc.) to received raw external sensor data, and transmits all raw external sensor data to the edge device 550 via a single channel. In such a configuration, the external message broker 544 may receive all raw external sensor data from the sensor hub 573a via a single external topic 548, but external topic rules 566 are configured to differentiate different portions of the received data as originating from different external sensors 542.

The sensor hub 573a of FIG. 5A relies on the external message broker 544 within the edge device 550. Without the external message broker 544, any signals transmitted from the sensor hub 573a to the edge device 550 may appear to the edge device 550 as arbitrary data streams. In FIG. 5B, an alternative implementation of a sensor hub 573b is illustrated, in which the sensor hub 573b is recognizable to the edge device 550 based on prior (e.g., off-the-shelf, firmware, etc.) configuration of the internal message broker 554. In such implementations, the sensor hub 573b is a proprietary hub device, and the internal message broker 554 of the edge device 550 includes one or more internal topics 558 for receiving data from the sensor hub 573b as internal sensor data (i.e., the sensor hub 573b can be treated as one or more internal sensors).

As illustrated, the sensor hub 573b can include its own external message broker instance 544'. In cases where there are multiple sensor hubs 573b, each can have its own respective external message broker instance 544'. The external message broker instance 544' is configured to permit customer creation of external topics 548 and customer configuration of external topic rules 566. Thus, external sensors 542 can be coupled with the sensor hub 573b (e.g., by wired or wireless connections), and external topics 548 of the external message broker instance 544' can receive raw external sensor data from those external sensors 542. The hub processor 575 can transmit the received sensor data to the edge device 550 via wired and/or wireless communication links, and the data can be received via one or more internal topics 558 of the internal message broker 554. The receiving internal topic(s) 558 may be subscribed to the bridging service 568, which is configured to apply transformations, etc. in accordance with the external topic rules 566 associated with the external topic 548 created on the external message broker instance 544'. For example, external topic 548 and/or external topic rules 566 are generated via a user interface between the customer portal 570 and the external message broker 544 on the edge device 550, and the edge device 550 communicates the created external topics 548 with the external message broker instance 544'.

Figure 6:
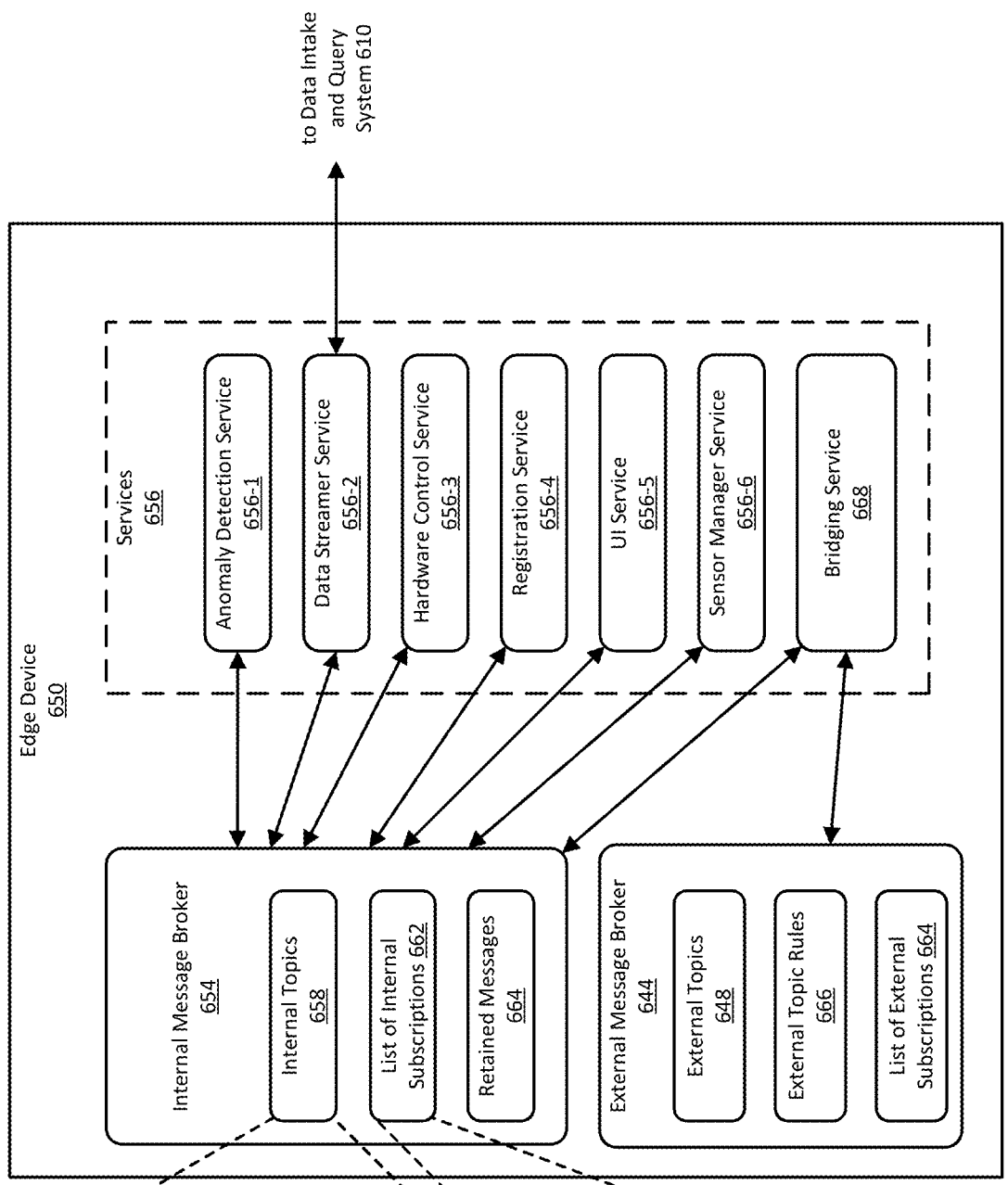
FIG. 6 illustrates a block diagram of an example edge device.

For added clarity, FIG. 6 provides further examples and descriptions of topics, subscriptions, and other concepts described herein. FIG. 6 illustrates a block diagram of an example edge device 650. In the illustrated example, the edge device 650 includes a message broker 654 and a set of services 656 that are configured to run on the edge device 650. The message broker 654 may maintain a set of topics 658, a list of subscriptions 662, and a set of retained messages 664. In the illustrated example, a set of topic IDs and client IDs are used by the message broker 654 to distinguish between different topics and clients, respectively.

The illustrated example may represent the contents of the topics 658 and the list of subscriptions 662 at a particular point in time while the message broker 654 is running on the edge device 650. The topics 658 include Topics T.1-T.12, which include topics for different types of sensor measurements, including Topic T.3 for temperature measurements, Topic T.4 for humidity measurements, and Topic T.5 for vibration measurements, as well as topics related to logs (Topic T.6) and anomalies (Topic T.7), among others. As described above, the number of topics in the topics 658 may increase or decrease when new topics are subscribed to or published on or when topics are no longer being subscribed to or published on.

The list of subscriptions 662 includes subscriptions for clients corresponding to sensors as well as clients corresponding to the services 656. In the illustrated example, the list of subscriptions 662 includes that Client Sensor.1 is subscribed to Topics T.9 and T.10, that Client Service.1 is subscribed to Topics T.3, T.4, and T.5, among others. As shown, multiple clients may be subscribed to a single topic, such as each of Clients Sensor.1, Sensor.2, and Sensor.3 being subscribed to Topics T.9 and T.10. Furthermore, sensor clients as well as service clients may be subscribed to a same topic, such as Clients Sensor.1 and Service.5 being subscribed to Topic T.10.

The illustrated example also shows several examples for services 656, including an anomaly detection service 656-1, a data streamer service 656-2, a hardware control service 656-3, a registration service 656-4, a user interface (UI) service 656-5, and a sensor management service 656-6. In some examples, the anomaly detection service 656-1 may collect certain sensor data acquired by the sensors and detect anomalies associated with the sensor data. The anomaly detection service 656-1 may employ one or more machine learning (ML) models, where various sensor data is inputted into one or more ML models to generate an output indicative of whether an anomaly was detected. For example, temperature data may be received by the anomaly detection service 656-1 and be inputted into a specific temperature ML model in order to identify anomalies and/or other alert conditions associated with a target operating temperature of a target device, the surrounding environment, or of the edge device 650 itself.

In some examples, the data streamer service 656-2 may transmit data collected at the edge device 650 to a data intake and query system 610. The data streamer service 656-2 may subscribe to one or more of the topics 658 in accordance with a configuration file or configuration data, which may be obtained (e.g., received) by the data streamer service 656-2 from an external device, such as the system 610. For example, a configuration file received by the data streamer service 656-2 may indicate that certain sensor data (e.g., temperature data) is to be sent to the system 610. The data streamer service 656-2 may then subscribe to the corresponding topic (e.g., Topic T.3) and relay data contained in any published messages back to the system 610.

The hardware control service 656-3 may control and manage the hardware components of the edge device 650. The registration service 656-4 may register the edge device 650 with a remote application running on a remote device, allowing the remote device to send configuration data to the edge device 650 for modifying the functionality of one or more of the services 665. The UI service 665-5 may manage the UI of the edge device 650 as well as any other I/O devices connected to or integrated with the edge device 650. The sensor management service 656-6 may communicate with one or more connected sensors and perform various actions that change the operation of the sensors (e.g., increase the rate that certain sensor data is measured and/or transmitted).

As illustrated and as described herein, one of the services can be a bridging service 668 for providing a secure bridge between the external message broker 644 and the internal message broker 654. The bridging service 668 is shown as one of the clients in the list of internal subscriptions 662. Though not explicitly shown, the bridging service 668 may also be a client in the list of external subscriptions 664. Also as illustrated, one or more internal topics 658 (e.g., Topic T.5) may be designated for use with external sensors and is subscribed to the bridging service 668. The designated internal topic 658 receives transformed external sensor data from the bridging service 668. Other services 656 can also be subscribed to the designated internal topic 658, such as to facilitate anomaly detection, data streaming, etc.

Figure 7:
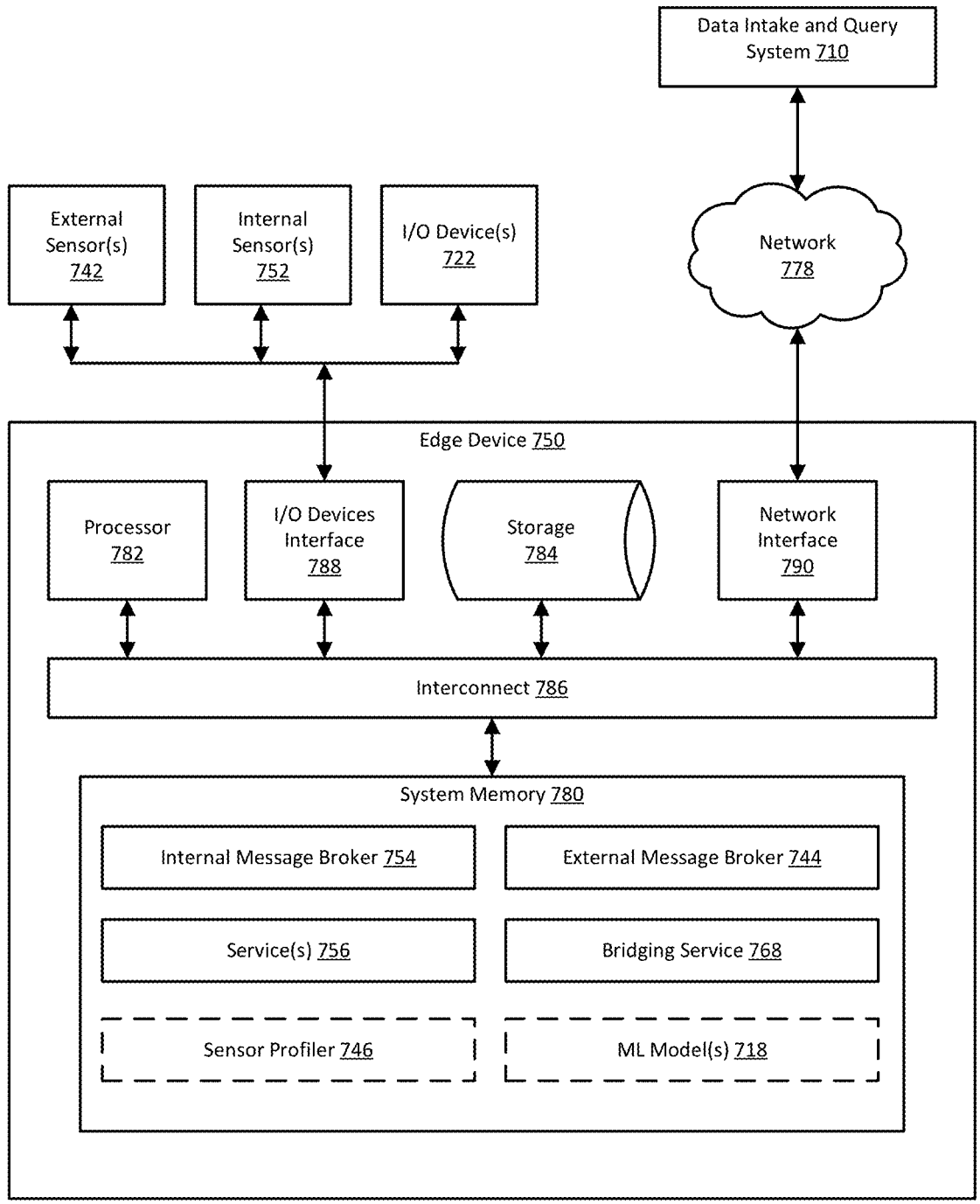
FIG. 7 illustrates a block diagram of an example edge device within a data processing environment.

FIG. 7 illustrates a block diagram of an example edge device 750 within a data processing environment 700. As shown, the data processing environment 700 may include, without limitation, a data intake and query system 710 and an edge device 750 communicating with one another over one or more communications networks 778. The edge device 750 may include, without limitation, a processor 782, storage 784, an input/output (I/O) device interface 788, a network interface 790, an interconnect 786, and system memory 780. The system memory 780 may include an internal message broker 754, an external message broker 744, one or more services 756, a bridging service 368 (i.e., which may be implemented as one of the services 756, but is shown separately for added clarity). The system memory 780 can optionally include a sensor profiler 746 and one or more ML models 718.

In general, the processor 782 may retrieve and execute programming instructions stored in the system memory 780, such as to implement the internal message broker 754, external message broker 744, services 756, bridging service 368, sensor profiler 746, ML models 718, and/or any operating system stored therein. The processor 782 may be any technically-feasible form of a processing device configured to process data and execute program code. The processor 782 could be, for example, a central processing unit (CPU), a graphics processing unit (GPU), an application-specific integrated circuit (ASIC), a field-programmable gate array (FPGA), and so forth. The processor 782 stores and retrieves application data residing in the system memory 780. The processor 782 is included to be representative of a single CPU, multiple CPUs, a single CPU having multiple processing cores, and the like. In operation, the processor 782 is the manager processor of the edge device 750, controlling and coordinating operations of the other system components.

The storage 784 may be a disk drive storage device. Although shown as a single unit, the storage 784 may be a combination of fixed and/or removable storage devices, such as fixed disc drives, floppy disc drives, tape drives, removable memory cards, or optical storage, network attached storage (NAS), or a storage area-network (SAN). The processor 782 may communicate to other computing devices and systems via the network interface 790, where the network interface 790 is configured to transmit and receive data via the communications network 778.

The interconnect 786 facilitates transmission, such as of programming instructions and application data, between the processor 782, the input/output (I/O) device interface 788, the storage 784, the network interface 790, and the system memory 780. The I/O device interface 788 is configured to transmit and receive data to and from one or more internal sensors 752, external sensors 742, and I/O devices 722. The I/O devices 722 may include one or more input devices (e.g., a keyboard, buttons, stylus, microphone, etc.) and/or one or more output devices (e.g., speaker, light-emitting diodes, etc.). In some instances, the I/O devices 722 includes a display device that displays an image and, in some examples, is integrated with the edge device 750. In various examples, the display device 724 may be a liquid crystal display (LCD) display, organic light-emitting diode (OLED) display, or a digital light processing (DLP) display. In some instances, the internal sensors 752 and/or external sensors 742 may include a camera that acquires images via a lens and converts the images into digital form, which may then be displayed on the display device.

The internal sensors 752 and/or external sensors 742 may include one or more of a variety of sensor types such as, without limitation, a light sensor, an image capture device (e.g., a camera), a sound sensor (e.g., microphone), a vibration sensor, one or more accelerometers (for measuring accelerations in one or more directions), one or more gyroscopes (for measuring rotations in one or more directions), a pressure sensor, a humidity sensor, a gas sensor (e.g., a $CO_2$ sensor), a location sensor (e.g., a Global Navigation Satellite System (GNSS) receiver), among other possibilities. As described herein, the internal sensors 752 and/or external sensors 742 may be physically disposed internally or externally to edge device 750, and they may communicate with the I/O device interface 788 via wired and/or wireless communication links. Further, though not explicitly shown, the internal sensors 752 and/or external sensors 742 may include, or may be coupled via, an intermediate sensor hub. The I/O device interface 788 includes physical and/or logical ports for interfacing with sensors, sensor hubs, etc.

Figure 8:
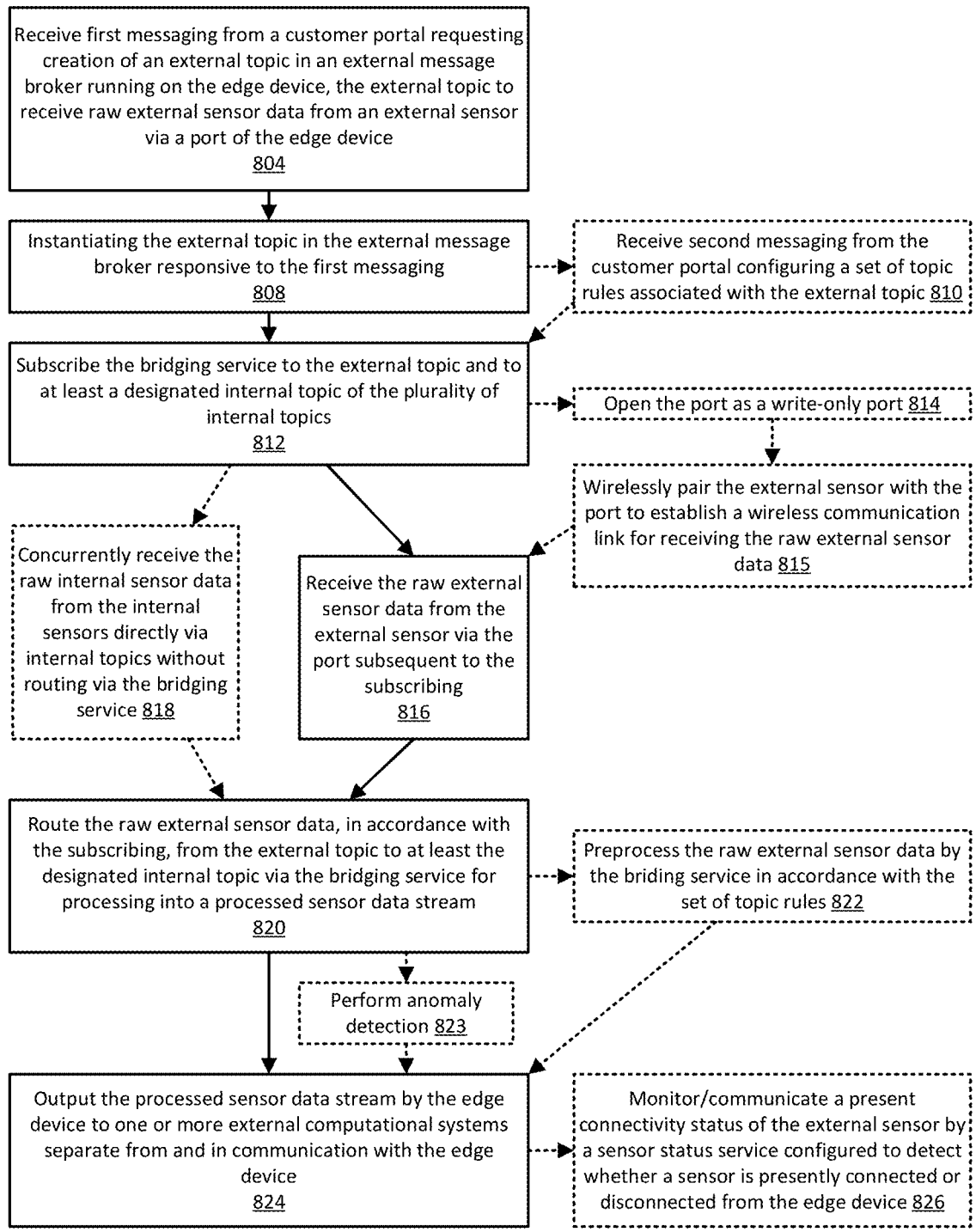
FIG. 8 illustrates a flowchart of an example process for integrating external sensors with an edge device.

FIG. 8 illustrates a flowchart of an example process 800 for integrating external sensors with an edge device. The example process 800 can be implemented using any of the edge device implementations described herein. For example, the example process 800 can be implemented, for example, by a device that comprises a processor and a non-transitory computer-readable medium. The non-transitory computer readable medium can be storing instructions that, when executed by the processor, can cause the processor to perform the operations of the illustrated process 800. Alternatively or additionally, the process 800 can be implemented using a non-transitory computer-readable medium storing instructions that, when executed by one or more processors, case the one or more processors to perform the operations of the process 800 of FIG. 8.

Embodiments of the process 800 begin at stage 804 by receiving first messaging by an edge device from a customer portal. The first messaging may request creation of an external topic in an external message broker running on the edge device. The external topic is to receive raw external sensor data from an external sensor via a port of the edge device. As described herein, the edge device further has, running thereon, an internal message broker and a bridging service. The internal message broker has internal topics not accessible via the customer portal. Each internal topic can be preconfigured to receive raw internal sensor data from one or more internal sensors.

At stage 808, the process 800 may instantiate the external topic in the external message broker responsive to the first messaging at stage 804. In some examples, the process 800 further includes receiving second messaging from the customer portal at stage 810. The second messaging is to configure a set of topic rules associated with the external topic.

At stage 812, the process 800 may subscribe the bridging service to the external topic and to at least a designated internal topic of the internal topics. In some examples, the external topic is one of multiple external topics created in the external message broker, each associated with receipt of respective raw external sensor data from a set of external sensors comprising the external sensor. In such examples, the bridging service may be one of several services running on the edge device to which the internal topics can be subscribed by the internal message broker, and the external broker may be restricted to subscribing the plurality of external topics only to the bridging service. In some cases, the internal message broker maintains a list of subscriptions indicating which of the services is subscribed to each of the internal topics, and the subscribing at stage 812 may involve updating the list of subscriptions to indicate that the bridging service is subscribed to the designated internal topic.

At stage 816, the process 800 may receive the raw external sensor data from the external sensor via the port subsequent to the subscribing at stage 812. Some examples of the process 800 may further include, at stage 818, receiving the raw internal sensor data from the one or more internal sensors directly via one or more of the plurality of internal topics without routing via the bridging service. The receipt of internal sensor data at stage 818 can be concurrent with the receipt of raw external sensor data from the external sensor at stage 816.

Some examples of the process 800 further include opening the port at stage 814 as a write-only port on the edge device. In such examples, the external sensor may be coupled with the write-only port prior to receiving the raw external sensor data at stage 816. Some examples of the process 800 further include wirelessly pairing the external sensor at stage 815 with the port to establish a wireless communication link, so that the receiving the raw external sensor data at stage 816 is via the wireless communication link. For example, the external sensor is coupled via a wired connection with a wireless hub device, and the wirelessly pairing involves wirelessly pairing the wireless hub device with the port to establish the wireless communication link. In such an example, the wireless hub device may receive the raw external sensor data from the external sensor via the wired connection and transmit the raw external sensor data wirelessly to the port of the edge device via the wireless communication link.

At stage 820, the process 800 may route the raw external sensor data, in accordance with the subscribing, from the external topic to at least the designated internal topic via the bridging service for processing into a processed sensor data stream. In some examples, in stage 822, the process 800 can pre-process the raw external sensor data by the bridging service in accordance with a set of topic rules (e.g., those configured in stage 810) prior to the routing to at least the designated internal topic in stage 820. The pre-processing at stage 822 may include transforming the raw sensor data into transformed sensor data by the bridging service in accordance with the set of topic rules. For example, the raw external sensor data may be transformed into a set of key-value pairs in accordance with the set of topic rules.

At stage 824, the process 800 may output the processed sensor data stream to one or more external computational systems separate from and in communication with the edge device. For example, the one or more external computational systems can include a data intake and query system. In some examples, the outputting at stage 824 is performed by a data streamer service running on the edge device. In some examples, at stage 823, the process 800 may further include performing anomaly detection on the processed sensor data stream by an anomaly detection service running on the edge device prior to outputting the processed sensor data stream at stage 824.

Some examples of the process 800 further include monitoring, at stage 826, a present connectivity status of the external sensor by a sensor status service. The sensor status service is one of the services running on the edge device, is configured to detect whether a sensor is presently connected or disconnected from the edge device, and is subscribed to at least the designated internal topic and not to the external topic. In some such examples, stage 826 can further include communicating the present connectivity status of the external sensor from the edge device to at least one of the one or more external computational systems.

Various examples of systems and methods are described herein with reference to data intake and query systems and related environments. For added clarity, aspects of such environments are described further below. Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 9:
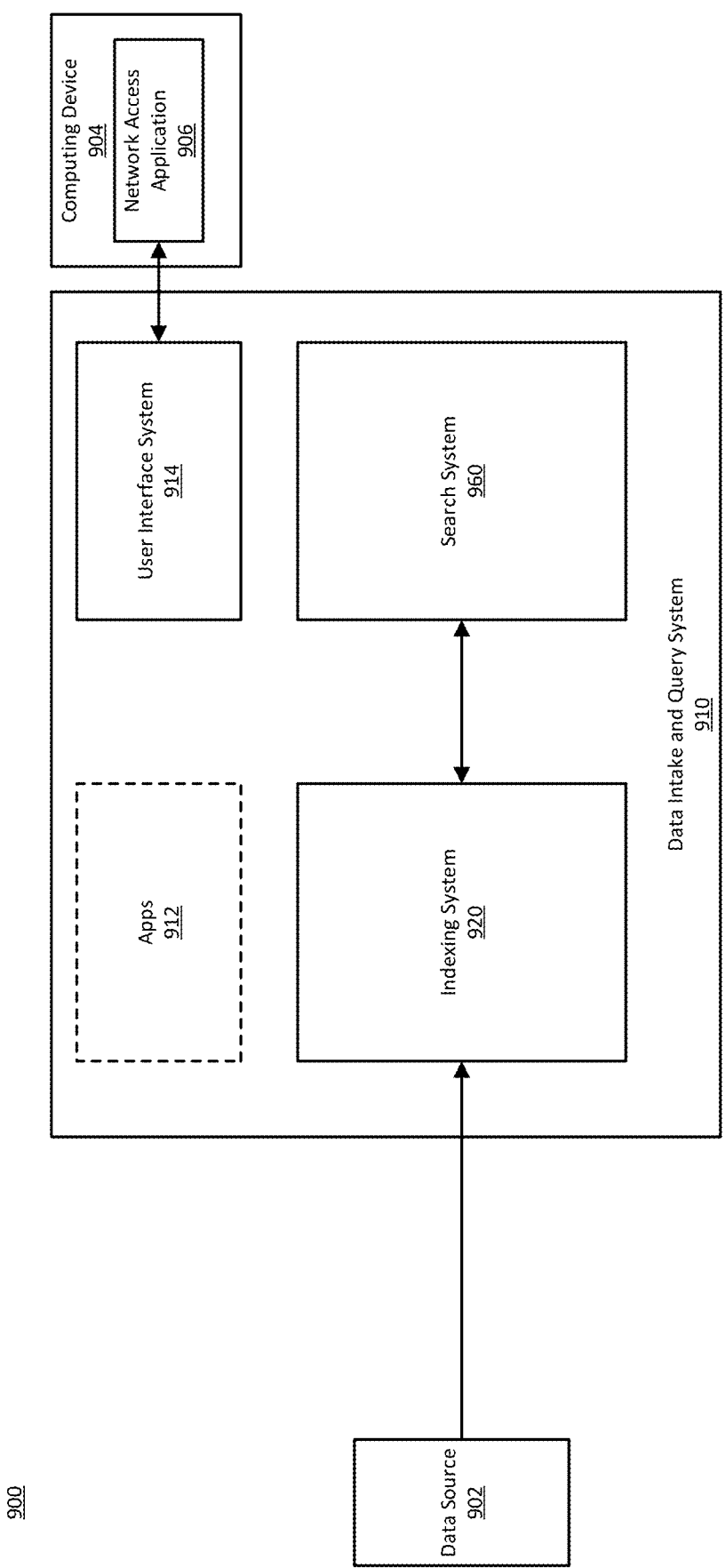
FIG. 9 is a block diagram illustrating an example computing environment that includes a data intake and query system.

FIG. 9 is a block diagram illustrating an example computing environment 900 that includes a data intake and query system 910. The data intake and query system 910 obtains data from a data source 902 in the computing environment 900 and ingests the data using an indexing system 920. A search system 960 of the data intake and query system 910 enables users to navigate the indexed data. Though drawn with separate boxes, in some implementations the indexing system 920 and the search system 960 can have overlapping components. A computing device 904, running a network access application 906, can communicate with the data intake and query system 910 through a user interface system 914 of the data intake and query system 910. Using the computing device 904, a user can perform various operations with respect to the data intake and query system 910, such as administration of the data intake and query system 910, management and generation of "knowledge objects," initiating of searches, and generation of reports, among other operations. The data intake and query system 910 can further optionally include apps 912 that extend the search, analytics, and/or visualization capabilities of the data intake and query system 910.

The data intake and query system 910 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 910 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 910 can execute on a single computing device, or may be distributed over multiple computing devices. For example, the program code can include instructions for executing both indexing and search components (which may be part of the indexing system 920 and/or the search system 960, respectively), and can be executed on a computing device that also provides the data source 902. As another example, the program code can execute on one computing device, where the program code executes both indexing and search components, while another copy of the program code executes on a second computing device that provides the data source 902. As another example, the program code can execute only an indexing component or only a search component. In this example, a first instance of the program code that is executing the indexing component and a second instance of the program code that is executing the search component can be executing on the same computing device or on different computing devices.

The data source 902 of the computing environment 900 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 902 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 920 obtains machine date from the data source 902 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 920 does not require prior knowledge of the structure of incoming data (e.g., the indexing system 920 does not need to be provided with a schema describing the data). Additionally, the indexing system 920 retains a copy of the data as it was received by the indexing system 920 such that the original data is always available for searching (e.g., no data is discarded, though, in some examples, the indexing system 920 can be configured to do so).

The search system 960 searches the data stored by the indexing system 920. As discussed in greater detail below, the search system 960 enables users associated with the computing environment 900 (and possibly also other users) to navigate the data, generate reports, and visualize results in "dashboards" output using a graphical interface. Using the facilities of the search system 960, users can obtain insights about the data, such as retrieving events from an index, calculating metrics, searching for specific conditions within a rolling time window, identifying patterns in the data, and predicting future trends, among other examples. To achieve greater efficiency, the search system 960 can apply map-reduce methods to parallelize searching of large volumes of data. Additionally, because the original data is available, the search system 960 can apply a schema to the data at search time. This allows different structures to be applied to the same data, or for the structure to be modified if or when the content of the data changes. Application of a schema at search time may be referred to herein as a late-binding schema technique.

The user interface system 914 provides mechanisms through which users associated with the computing environment 900 (and possibly others) can interact with the data intake and query system 910. These interactions can include configuration, administration, and management of the indexing system 920, initiation and/or scheduling of queries to the search system 960, receipt or reporting of search results, and/or visualization of search results. The user interface system 914 can include, for example, facilities to provide a command line interface or a web-based interface.

Users can access the user interface system 914 using a computing device 904 that communicates with data intake and query system 910, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 900. For example, a person can log in as a particular user and, using the user's digital information, can access the data intake and query system 910. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 904 can provide a human-machine interface through which a person can have a digital presence in the computing environment 900 in the form of a user. The computing device 904 is an electronic device having one or more processors and a memory capable of storing instructions for execution by the one or more processors. The computing device 904 can further include input/output (I/O) hardware and a network interface. Applications executed by the computing device 904 can include a network access application 906, which can a network interface of the client computing device 904 to communicate, over a network, with the user interface system 914 of the data intake and query system 910. The user interface system 914 can use the network access application 906 to generate user interfaces that enable a user to interact with the data intake and query system 910. A web browser is one example of a network access application. A shell tool can also be used as a network access application. In some examples, the data intake and query system 910 is an application executing on the computing device 904. In such examples, the network access application 906 can access the user interface system 914 without needed to go over a network.

The data intake and query system 910 can optionally include apps 912. An app of the data intake and query system 910 is a collection of configurations, knowledge objects (a user-defined entity that enriches the data in the data intake and query system 910), views, and dashboards that may provide additional functionality, different techniques for searching the data, and/or additional insights into the data. The data intake and query system 910 can execute multiple applications simultaneously. Example applications include an information technology service intelligence application, which can monitor and analyze the performance and behavior of the computing environment 900, and an enterprise security application, which can include content and searches to assist security analysts in diagnosing and acting on anomalous or malicious behavior in the computing environment 900.

Though FIG. 9 illustrates only one data source, in practical implementations, the computing environment 900 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 900, the data intake and query system 910 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 900 can include on-prem and cloud-based computing resources, or only cloud-based resources. For example, an entity may have on-prem computing devices and a private cloud. In this example, the entity operates the data intake and query system 910 and can choose to execute the data intake and query system 910 on an on-prem computing device or in the cloud. In another example, a provider entity operates the data intake and query system 910 in a public cloud and provides the functionality of the data intake and query system 910 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 910. In some implementations, the entity providing the data intake and query system 910 is itself subscribing to the cloud services of a cloud service provider. As an example, a first entity provides computing resources under a public cloud service model, a second entity subscribes to the cloud services of the first provider entity and uses the cloud computing resources to operate the data intake and query system 910, and a third entity can subscribe to the services of the second provider entity in order to use the functionality of the data intake and query system 910. In this example, the data sources are associated with the third entity, users accessing the data intake and query system 910 are associated with the third entity, and the analytics and insights provided by the data intake and query system 910 are for purposes of the third entity's operations.

Figure 10:
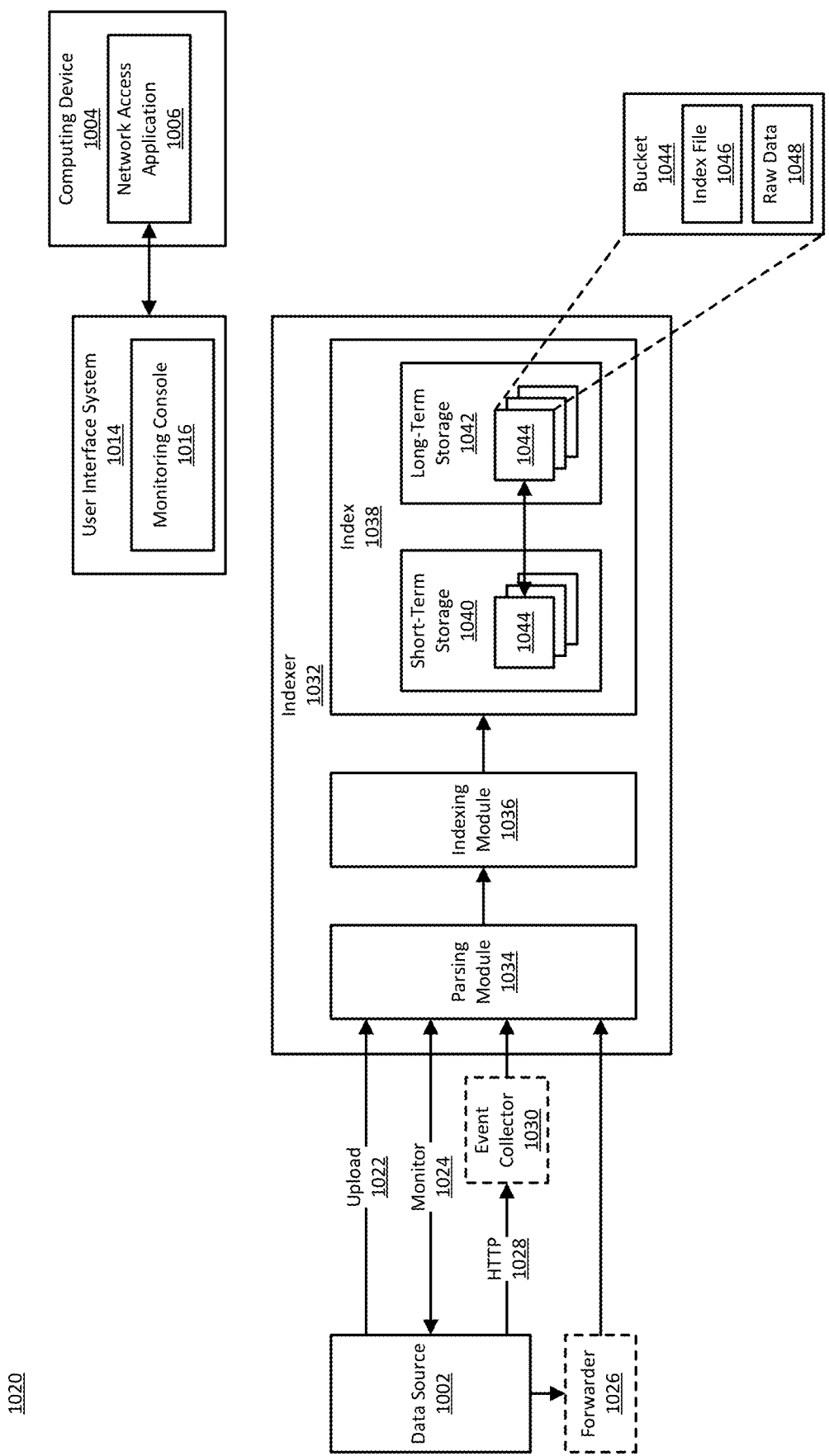
FIG. 10 is a block diagram illustrating in greater detail an example of an indexing system of a data intake and query system, such as the data intake and query system of FIG. 9.

FIG. 10 is a block diagram illustrating in greater detail an example of an indexing system 1020 of a data intake and query system, such as the data intake and query system 910 of FIG. 9. The indexing system 1020 of FIG. 10 uses various methods to obtain machine data from a data source 1002 and stores the data in an index 1038 of an indexer 1032. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1020 enables the data intake and query system to obtain the machine data produced by the data source 1002 and to store the data for searching and retrieval.

Users can administer the operations of the indexing system 1020 using a computing device 1004 that can access the indexing system 1020 through a user interface system 1014 of the data intake and query system. For example, the computing device 1004 can be executing a network access application 1006, such as a web browser or a terminal, through which a user can access a monitoring console 1016 provided by the user interface system 1014. The monitoring console 1016 can enable operations such as: identifying the data source 1002 for indexing; configuring the indexer 1032 to index the data from the data source 1002; configuring a data ingestion method; configuring, deploying, and managing clusters of indexers; and viewing the topology and performance of a deployment of the data intake and query system, among other operations. The operations performed by the indexing system 1020 may be referred to as "index time" operations, which are distinct from "search time" operations that are discussed further below.

The indexer 1032, which may be referred to herein as a data indexing component, coordinates and performs most of the index time operations. The indexer 1032 can be implemented using program code that can be executed on a computing device. The program code for the indexer 1032 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1032. In some implementations, the indexer 1032 executes on the computing device 1004 through which a user can access the indexing system 1020. In some implementations, the indexer 1032 executes on a different computing device.

The indexer 1032 may be executing on the computing device that also provides the data source 1002 or may be executing on a different computing device. In implementations wherein the indexer 1032 is on the same computing device as the data source 1002, the data produced by the data source 1002 may be referred to as "local data." In other implementations the data source 1002 is a component of a first computing device and the indexer 1032 executes on a second computing device that is different from the first computing device. In these implementations, the data produced by the data source 1002 may be referred to as "remote data." In some implementations, the first computing device is "on-prem" and in some implementations the first computing device is "in the cloud." In some implementations, the indexer 1032 executes on a computing device in the cloud and the operations of the indexer 1032 are provided as a service to entities that subscribe to the services provided by the data intake and query system.

For a given data produced by the data source 1002, the indexing system 1020 can be configured to use one of several methods to ingest the data into the indexer 1032. These methods include upload 1022, monitor 1024, using a forwarder 1026, or using HyperText Transfer Protocol (HTTP 1028) and an event collector 1030. These and other methods for data ingestion may be referred to as "getting data in" (GDI) methods.

Using the upload 1022 method, a user can instruct the indexing system to 1002 to specify a file for uploading into the indexer 1032. For example, the monitoring console 1016 can include commands or an interface through which the user can specify where the file is located (e.g., on which computing device and/or in which directory of a file system) and the name of the file. Once uploading is initiated, the indexer 1032 processes the file, as discussed further below. Uploading is a manual process and occurs when instigated by a user. For automated data ingestion, the other ingestion methods are used.

The monitor 1024 method enables the indexing system 1020 to monitor the data source 1002 and continuously or periodically obtain data produced by the data source 1002 for ingestion by the indexer 1032. For example, using the monitoring console 1016, a user can specify a file or directory for monitoring. In this example, the indexing system 1020 can execute a monitoring process that detects whenever data is added to the file or directory and causes the data to be sent to the indexer 1032. As another example, a user can specify a network port for monitoring. In this example, a monitoring process can capture data received at or transmitting from the network port and cause the data to be sent to the indexer 1032. In various examples, monitoring can also be configured for data sources such as operating system event logs, performance data generated by an operating system, operating system registries, operating system directory services, and other data sources.

Monitoring is available when the data source 1002 is local to the indexer 1032 (e.g., the data source 1002 is on the computing device where the indexer 1032 is executing). Other data ingestion methods, including forwarding and the event collector 1030, can be used for either local or remote data sources.

A forwarder 1026, which may be referred to herein as a data forwarding component, is a software process that sends data from the data source 1002 to the indexer 1032. The forwarder 1026 can be implemented using program code that can be executed on the computer device that provides the data source 1002. A user launches the program code for the forwarder 1026 on the computing device that provides the data source 1002. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1026 can provide various capabilities. For example, the forwarder 1026 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1026 can break the data into individual events (event generation is discussed further below) and send the events to a receiver. Other operations that the forwarder 1026 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1030 provides an alternate method for obtaining data from the data source 1002. The event collector 1030 enables data and application events to be sent to the indexer 1032 using HTTP 1028. The event collector 1030 can be implemented using program code that can be executing on a computing device. The program code may be a component of the data intake and query system or can be a standalone component that can be executed independently of the data intake and query system and operates in cooperation with the data intake and query system.

To use the event collector 1030, a user can, for example using the monitoring console 1016 or a similar interface provided by the user interface system 1014, enable the event collector 1030 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1002 as an alternative method to using a username and password for authentication.

To send data to the event collector 1030, the data source 1002 is supplied with a token and can then send HTTP 1028 requests to the event collector 1030. To send HTTP 1028 requests, the data source 1002 can be configured to use an HTTP client and/or to use logging libraries such as those supplied by Java, JavaScript, and .NET libraries. An HTTP client enables the data source 1002 to send data to the event collector 1030 by supplying the data, and a Uniform Resource Identifier (URI) for the event collector 1030 to the HTTP client. The HTTP client then handles establishing a connection with the event collector 1030, transmitting a request containing the data, closing the connection, and receiving an acknowledgment if the event collector 1030 sends one. Logging libraries enable HTTP 1028 requests to the event collector 1030 to be generated directly by the data source. For example, an application can include or link a logging library, and through functionality provided by the logging library manage establishing a connection with the event collector 1030, transmitting a request, and receiving an acknowledgement.

An HTTP 1028 request to the event collector 1030 can contain a token, a channel identifier, event metadata, and/or event data. The token authenticates the request with the event collector 1030. The channel identifier, if available in the indexing system 1020, enables the event collector 1030 to segregate and keep separate data from different data sources. The event metadata can include one or more key-value pairs that describe the data source 1002 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1030 extracts events from HTTP 1028 requests and sends the events to the indexer 1032. The event collector 1030 can further be configured to send events or event data to one or more indexers. Extracting the events can include associating any metadata in a request with the event or events included in the request. In these implementations, event generation by the indexer 1032 (discussed further below) is bypassed, and the indexer 1032 moves the events directly to indexing. In some implementations, the event collector 1030 extracts event data from a request and outputs the event data to the indexer 1032, and the indexer generates events from the event data. In some implementations, the event collector 1030 sends an acknowledgement message to the data source 1002 to indicate that the event collector 1030 has received a particular request form the data source 1002, and/or to indicate to the data source 1002 that events in the request have been added to an index.

The indexer 1032 ingests incoming data and transforms the data into searchable knowledge in the form of events. In the data intake and query system, an event is a single piece of data that represents activity of the component represented in FIG. 10 by the data source 1002. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1032 can include a parsing module 1034 and an indexing module 1036 for generating and storing the events. The parsing module 1034 and indexing module 1036 can be modular and pipelined, such that one component can be operating on a first set of data while the second component is simultaneously operating on a second sent of data. Additionally, the indexer 1032 may at any time have multiple instances of the parsing module 1034 and indexing module 1036, with each set of instances configured to simultaneously operate on data from the same data source or from different data sources. The parsing module 1034 and indexing module 1036 are illustrated to facilitate discussion, with the understanding that implementations with other components are possible to achieve the same functionality.

The parsing module 1034 determines information about event data, where the information can be used to identify events within the event data. For example, the parsing module 1034 can associate a source type with the event data. A source type identifies the data source 1002 and describes a possible data structure of event data produced by the data source 1002. For example, the source type can indicate which fields to expect in events generated at the data source 1002 and the keys for the values in the fields, and possibly other information such as sizes of fields, an order of the fields, a field separator, and so on. The source type of the data source 1002 can be specified when the data source 1002 is configured as a source of event data. Alternatively, the parsing module 1034 can determine the source type from the event data, for example from an event field or using machine learning.

Other information that the parsing module 1034 can determine includes timestamps. In some cases, an event includes a timestamp as a field, and the timestamp indicates a point in time when the action represented by the event occurred or was recorded by the data source 1002 as event data. In these cases, the parsing module 1034 may be able to determine from the source type associated with the event data that the timestamps can be extracted from the events themselves. In some cases, an event does not include a timestamp and the parsing module 1034 determines a timestamp for the event, for example from a name associated with the event data from the data source 1002 (e.g., a file name when the event data is in the form of a file) or a time associated with the event data (e.g., a file modification time). As another example, when the parsing module 1034 is not able to determine a timestamp from the event data, the parsing module 1034 may use the time at which it is indexing the event data. As another example, the parsing module 1034 can use a user-configured rule to determine the timestamps to associate with events.

The parsing module 1034 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1034 may be able to determine event boundaries from the source type associated with the event data, for example from a data structure indicated by the source type. In some implementations, a user can configure rules the parsing module 1034 can use to identify event boundaries.

The parsing module 1034 can further extract data from events and possibly also perform transformations on the events. For example, the parsing module 1034 can extract a set of fields for each event, such as a host or hostname, source or source name, and/or source type. The parsing module 1034 may extract certain fields by default or based on a user configuration. Alternatively or additionally, the parsing module 1034 may add fields to events, such as a source type or a user-configured field. As another example of a transformation, the parsing module 1034 can anonymize fields in events to mask sensitive information, such as social security numbers or account numbers. Anonymizing fields can include changing or replacing values of specific fields. The parsing component 1034 can further perform user-configured transformations.

The parsing module 1034 outputs the results of processing incoming event data to the indexing module 1036, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1032 can be configured to identify searchable segments that are parts of fields, searchable segments that are entire fields, or both. The parsing module 1034 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1046, to find event data that matches a search query. In some implementations, segmentation can alternatively be performed by the forwarder 1026. Segmentation can also be disabled, in which case the indexer 1032 will not build a lexicon for the event data. When segmentation is disabled, the search system searches the event data directly.

Building index data structures generates the index 1038. The index 1038 is a storage data structure on a storage device (e.g., a disk drive or other physical device for storing digital data). The storage device may be a component of the computing device on which the indexer 1032 is operating (referred to herein as local storage) or may be a component of a different computing device (referred to herein as remote storage) that the indexer 1038 has access to over a network. The indexer 1032 can include more than one index and can include indexes of different types. For example, the indexer 1032 can include event indexes, which impose minimal structure on stored data and can accommodate any type of data. As another example, the indexer 1032 can include metrics indexes, which use a highly structured format to handle the higher volume and lower latency demands associated with metrics data.

The indexing module 1036 organizes files in the index 1038 in directories referred to as buckets. The files in a bucket 1044 can include raw data files, index files, and possibly also other metadata files. As used herein, "raw data" means data as when the data was produced by the data source 1002, without alteration to the format or content. As noted previously, the parsing component 1034 may add fields to event data and/or perform transformations on fields in the event data, and thus a raw data file 1048 can include, in addition to or instead of raw data, what is referred to herein as enriched raw data. The raw data file 1048 may be compressed to reduce disk usage. An index file 1046, which may also be referred to herein as a "time-series index" or tsidx file, contains metadata that the indexer 1032 can use to search a corresponding raw data file 1048. As noted above, the metadata in the index file 1046 includes a lexicon of the event data, which associates each unique keyword in the event data in the raw data file 1048 with a reference to the location of event data within the raw data file 1048. The keyword data in the index file 1046 may also be referred to as an inverted index. In various implementations, the data intake and query system can use index files for other purposes, such as to store data summarizations that can be used to accelerate searches.

A bucket 1044 includes event data for a particular range of time. The indexing module 1036 arranges buckets in the index 1038 according to the age of the buckets, such that buckets for more recent ranges of time are stored in short-term storage 1040 and buckets for less recent ranges of time are stored in long-term storage 1042. Short-term storage 1040 may be faster to access while long-term storage 1042 may be slower to access. Buckets may move from short-term storage 1040 to long-term storage 1042 according to a configurable data retention policy, which can indicate at what point in time a bucket is old enough to be moved.

A bucket's location in short-term storage 1040 or long-term storage 1042 can also be indicated by the bucket's status. As an example, a bucket's status can be "hot," "warm," "cold," "frozen," or "thawed." In this example, hot bucket is one to which the indexer 1032 is writing data and the bucket becomes a warm bucket when the index 1032 stops writing data to it. In this example, both hot and warm buckets reside in short-term storage 1040. Continuing this example, when a warm bucket is moved to long-term storage 1042, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1020 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 1020 through the monitoring console 1016 provided by the user interface system 1014. Using the monitoring console 1016, the user can configure and monitor an index cluster, and see information such as disk usage by an index, volume usage by an indexer, index and volume size over time, data age, statistics for bucket types, and bucket settings, among other information.

Figure 11:
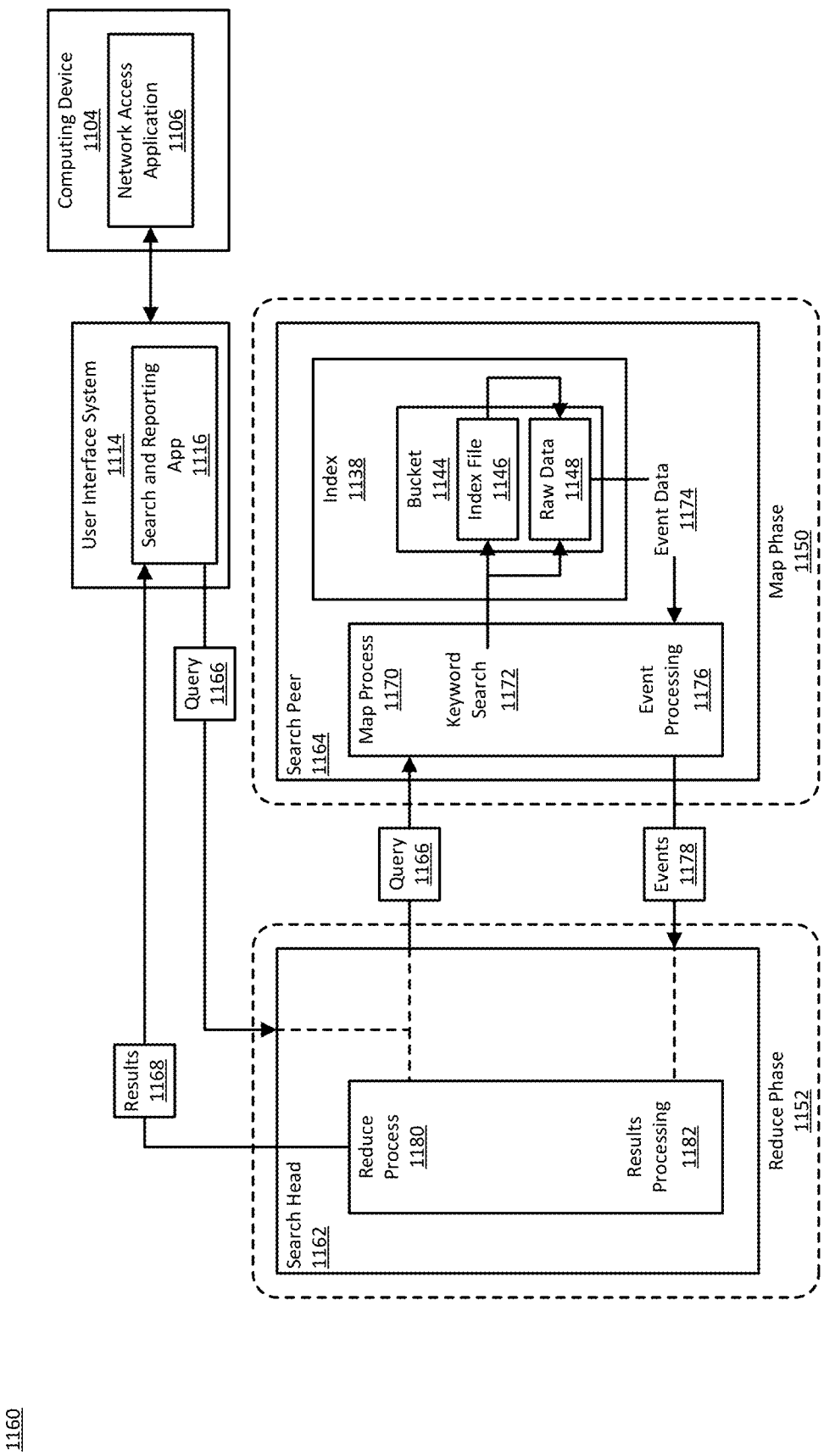
FIG. 11 is a block diagram illustrating in greater detail an example of the search system of a data intake and query system, such as the data intake and query system of FIG. 9.

FIG. 11 is a block diagram illustrating in greater detail an example of the search system 1160 of a data intake and query system, such as the data intake and query system 910 of FIG. 9. The search system 1160 of FIG. 11 issues a query 1166 to a search head 1162, which sends the query 1166 to a search peer 1164. Using a map process 1170, the search peer 1164 searches the appropriate index 1138 for events identified by the query 1166 and sends events 1178 so identified back to the search head 1162. Using a reduce process 1182, the search head 1162 processes the events 1178 and produces results 1168 to respond to the query 1166. The results 1168 can provide useful insights about the data stored in the index 1138. These insights can aid in the administration of information technology systems, in security analysis of information technology systems, and/or in analysis of the development environment provided by information technology systems.

The query 1166 that initiates a search is produced by a search and reporting app 1116 that is available through the user interface system 1114 of the data intake and query system. Using a network access application 1106 executing on a computing device 1104, a user can input the query 1166 into a search field provided by the search and reporting app 1116. Alternatively or additionally, the search and reporting app 1116 can include pre-configured queries or stored queries that can be activated by the user. In some cases, the search and reporting app 1116 initiates the query 1166 when the user enters the query 1166. In these cases, the query 1166 maybe referred to as an "ad-hoc" query. In some cases, the search and reporting app 1116 initiates the query 1166 based on a schedule. For example, the search and reporting app 1116 can be configured to execute the query 1166 once per hour, once per day, at a specific time, on a specific date, or at some other time that can be specified by a date, time, and/or frequency. These types of queries maybe referred to as scheduled queries.

The query 1166 is specified using a search processing language. The search processing language includes commands that the search peer 1164 will use to identify events to return in the search results 1168. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1166 to include sequential commands, where a subsequent command may operate on the results of a prior command. As an example, sequential commands may be separated in the query 1166 by a vertical line ("|" or "pipe") symbol.

In addition to one or more search commands, the query 1166 includes a time indicator. The time indicator limits searching to events that have timestamps described by the indicator. For example, the time indicator can indicate a specific point in time (e.g., 11:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1166 occurs in two broad phases: a map phase 1150 and a reduce phase 1152. The map phase 1150 takes place across one or more search peers. In the map phase 1150, the search peers locate event data that matches the search terms in the search query 1166 and sorts the event data into field-value pairs. When the map phase 1150 is complete, the search peers send events that they have found to one or more search heads for the reduce phase 1152. During the reduce phase 1152, the search heads process the events through commands in the search query 1166 and aggregate the events to produce the final search results 1168.

A search head, such as the search head 1162 illustrated in FIG. 11, is a component of the search system 1160 that manages searches. The search head 1162, which may also be referred to herein as a search management component, can be implemented using program code that can be executed on a computing device. The program code for the search head 1162 can be stored on a non-transitory computer-readable medium and from this medium can be loaded or copied to the memory of a computing device. One or more hardware processors of the computing device can read the program code from the memory and execute the program code in order to implement the operations of the search head 1162.

Upon receiving the search query 1166, the search head 1162 directs the query 1166 to one or more search peers, such as the search peer 1164 illustrated in FIG. 11. "Search peer" is an alternate name for "indexer" and a search peer may be largely similar to the indexer described previously. The search peer 1164 may be referred to as a "peer node" when the search peer 1164 is part of an indexer cluster. The search peer 1164, which may also be referred to as a search execution component, can be implemented using program code that can be executed on a computing device. In some implementations, one set of program code implements both the search head 1162 and the search peer 1164 such that the search head 1162 and the search peer 1164 form one component. In some implementations, the search head 1162 is an independent piece of code that performs searching and no indexing functionality. In these implementations, the search head 1162 may be referred to as a dedicated search head.

The search head 1162 may consider multiple criteria when determining whether to send the query 1166 to the particular search peer 1164. For example, the search system 1160 may be configured to include multiple search peers that each have duplicative copies of at least some of the event data. In this example, the sending the search query 1166 to more than one search peer allows the search system 1160 to distribute the search workload across different hardware resources. As another example, search system 1160 may include different search peers for different purposes (e.g., one has an index storing a first type of data or from a first data source while a second has an index storing a second type of data or from a second data source). In this example, the search query 1166 may specify which indexes to search, and the search head 1162 will send the query 1166 to the search peers that have those indexes.

To identify events 1178 to send back to the search head 1162, the search peer 1164 performs a map process 1170 to obtain event data 1174 from the index 1138 that is maintained by the search peer 1164. During a first phase of the map process 1170, the search peer 1164 identifies buckets that have events that are described by the time indicator in the search query 1166. As noted above, a bucket contains events whose timestamps fall within a particular range of time. For each bucket 1144 whose events can be described by the time indicator, during a second phase of the map process 1170, the search peer 1164 performs a keyword search 1174 using search terms specified in the search query 1166. The search terms can be one or more of keywords, phrases, fields, Boolean expressions, and/or comparison expressions that in combination describe events being searched for. When segmentation is enabled at index time, the search peer 1164 performs the keyword search 1172 on the bucket's index file 1146. As noted previously, the index file 1146 includes a lexicon of the searchable terms in the events stored in the bucket's raw data 1148 file. The keyword search 1172 searches the lexicon for searchable terms that correspond to one or more of the search terms in the query 1166. As also noted above, the lexicon includes, for each searchable term, a reference to each location in the raw data 1148 file where the searchable term can be found. Thus, when the keyword search identifies a searchable term in the index file 1146 that matches query 1166, the search peer 1164 can use the location references to extract from the raw data 1148 file the event data 1174 for each event that includes the searchable term.

In cases where segmentation was disabled at index time, the search peer 1164 performs the keyword search 1172 directly on the raw data 1148 file. To search the raw data 1148, the search peer 1164 may identify searchable segments in events in a similar manner as when the data was indexed. Thus, depending on how the search peer 1164 is configured, the search peer 1164 may look at event fields and/or parts of event fields to determine whether an event matches the query 1166. Any matching events can be added to the event data 1174 read from the raw data 1148 file. The search peer 1164 can further be configured to enable segmentation at search time, so that searching of the index 1138 causes the search peer 1164 to build a lexicon in the index file 1146.

The event data 1174 obtained from the raw data 1148 file includes the full text of each event found by the keyword search 1172. During a third phase of the map process 1170, the search peer 1164 performs event processing 1176 on the event data 1174, with the steps performed being determined by the configuration of the search peer 1164 and/or commands in the search query 1166. For example, the search peer 1164 can be configured to perform field discovery and field extraction. Field discovery is a process by which the search peer 1164 identifies and extracts key-value pairs from the events in the event data 1174. The search peer 1164 can, for example, be configured to automatically extract the first 110 fields (or another number of fields) in the event data 1174 that can be identified as key-value pairs. As another example, the search peer 1164 can extract any fields explicitly mentioned in the search query 1166. The search peer 1164 can, alternatively or additionally, be configured with particular field extractions to perform.

Other examples of steps that can be performed during event processing 1176 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1164 sends processed events 1178 to the search head 1162, which performs a reduce process 1180. The reduce process 1180 potentially receives events from multiple search peers and performs various results processing 1182 steps on the events. The results processing 1182 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1182 can further include applying commands from the search query 1166 to the events. The query 1166 can include, for example, commands for evaluating and/or manipulating fields (e.g., to generate new fields from existing fields or parse fields that have more than one value). As another example, the query 1166 can include commands for calculating statistics over the events, such as counts of the occurrences of fields, or sums, averages, ranges, and so on, of field values. As another example, the query 1166 can include commands for generating statistical values for purposes of generating charts of graphs of the events.

Through results processing 1182, the reduce process 1180 produces the events found by processing the search query 1166, as well as some information about the events, which the search head 1162 outputs to the search and reporting app 1116 as search results 1168. The search and reporting app 1116 can generate visual interfaces for viewing the search results 1168. The search and reporting app 1116 can, for example, output visual interfaces for the network access application 1106 running on a computing device 1104 to generate.

The visual interfaces can include various visualizations of the search results 1168, such as tables, line or area charts, Chloropleth maps, or single values. The search and reporting app 1116 can organize the visualizations into a dashboard, where the dashboard includes a panel for each visualization. A dashboard can thus include, for example, a panel listing the raw event data for the events in the search results 1168, a panel listing fields extracted at index time and/or found through field discovery along with statistics for those fields, and/or a timeline chart indicating how many events occurred at specific points in time (as indicated by the timestamps associated with each event). In various implementations, the search and reporting app 1116 can provide one or more default dashboards. Alternatively or additionally, the search and reporting app 1116 can include functionality that enables a user to configure custom dashboards.

The search and reporting app 1116 can also enable further investigation into the events in the search results 1116. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1166. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving first messaging by an edge device from a customer portal, the first messaging requesting creation of an external topic in an external message broker running on the edge device, the external topic to receive raw external sensor data from an external sensor via a port of the edge device,
wherein the edge device further has, running thereon, an internal message broker and a bridging service, the internal message broker having a plurality of internal topics not accessible via the customer portal, each internal topic preconfigured to receive raw internal sensor data from one or more internal sensors;
instantiating, by the edge device, the external topic in the external message broker responsive to the first messaging;
subscribing, by the edge device, the bridging service to the external topic and to at least a designated internal topic of the plurality of internal topics;
receiving the raw external sensor data from the external sensor via the port subsequent to the subscribing;
routing the raw external sensor data, in accordance with the subscribing, from the external topic to at least the designated internal topic via the bridging service for processing into a processed sensor data stream; and
outputting the processed sensor data stream by the edge device to one or more external computational systems separate from and in communication with the edge device.

2. The computer-implemented method of claim 1, wherein:
the external topic is one of a plurality of external topics created in the external message broker, each of the plurality of external topics associated with receipt of respective raw external sensor data from a set of external sensors comprising the external sensor;
the bridging service is one of a plurality of services running on the edge device to which the plurality of internal topics can be subscribed by the internal message broker; and
the external broker is restricted to subscribing the plurality of external topics only to the bridging service.

3. The computer-implemented method of claim 1, further comprising:
opening the port as a write-only port on the edge device, wherein the external sensor is coupled with the write-only port prior to the receiving the raw external sensor data.

4. The computer-implemented method of claim 1, further comprising:
receiving second messaging by the edge device from the customer portal, the second messaging configuring a set of topic rules associated with the external topic; and
pre-processing the raw external sensor data by the bridging service in accordance with the set of topic rules prior to the routing to at least the designated internal topic.

5. The computer-implemented method of claim 4, wherein:
the pre-processing the raw external sensor data comprises transforming the raw sensor data into transformed sensor data by the bridging service in accordance with the set of topic rules.

6. The computer-implemented method of claim 5, wherein:
the transforming comprises transforming the raw sensor data into a set of key-value pairs in accordance with the set of topic rules.

7. The computer-implemented method of claim 1, wherein:
the bridging service is one of a plurality of services running on the edge device;
the internal message broker maintains a list of subscriptions indicating which of the plurality of services is subscribed to each of the plurality of internal topics; and
the subscribing comprises updating the list of subscriptions to indicate that the bridging service is subscribed to the designated internal topic.

8. The computer-implemented method of claim 7, further comprising:
performing anomaly detection on the processed sensor data stream by an anomaly detection service prior to the outputting the processed sensor data stream, the anomaly detection service being one of the plurality of services running on the edge device.

9. The computer-implemented method of claim 7, wherein the plurality of services running on the edge device comprises a data streamer service, and the outputting is by the data streamer service.

10. The computer-implemented method of claim 7, further comprising:
monitoring a present connectivity status of the external sensor by a sensor status service, the sensor status service being one of the plurality of services running on the edge device, being configured to detect whether a sensor is presently connected or disconnected from the edge device, and being subscribed to at least the designated internal topic and not to the external topic; and
communicating the present connectivity status of the external sensor from the edge device to at least one of the one or more external computational systems.

11. The computer-implemented method of claim 1, further comprising:
receiving the raw internal sensor data from the one or more internal sensors directly via one or more of the plurality of internal topics without routing via the bridging service, the internal sensor data received concurrent with the receiving the raw external sensor data from the external sensor.

12. The computer-implemented method of claim 1, further comprising:
wirelessly pairing the external sensor with the port to establish a wireless communication link, the receiving the raw external sensor data being via the wireless communication link.

13. The computer-implemented method of claim 12, wherein:
the external sensor is coupled via a wired connection with a wireless hub device; and
the wirelessly pairing comprises wirelessly pairing the wireless hub device with the port to establish the wireless communication link, the wireless hub device configured to receive the raw external sensor data from the external sensor via the wired connection and to transmit the raw external sensor data wirelessly to port of the edge device via the wireless communication link.

14. The computer-implemented method of claim 13, wherein:

the external sensor is one of a moisture sensor or a current monitor, coupled with the wireless hub device via a standard headphone jack interface.

15. The computer-implemented method of claim 1, wherein the one or more external computational systems is a data intake and query system.

16. An edge device physically installed at an edge of a network of computational devices, the edge device comprising:
    a device housing;
    one or more communication ports;
    one or more internal sensors;
    one or more processors disposed within the device housing and communicatively coupled with the one or more communication ports; and
    a non-transitory computer-readable medium disposed within the device housing and having stored thereon instructions that, when executed by the one or more processors, cause the one or more processors to implement an internal message broker, an external message broker, and a bridging service, and to perform operations comprising:
        receiving first messaging from a customer portal, the first messaging requesting creation of an external topic in the external message broker, the external topic to receive raw external sensor data from an external sensor via a port of the one or more communication ports,
        wherein internal message broker has a plurality of internal topics not accessible via the customer portal, the internal topics preconfigured to receive raw internal sensor data from the one or more internal sensors;
        instantiating the external topic in the external message broker responsive to the first messaging;
        subscribing the bridging service to the external topic and to at least a designated internal topic of the plurality of internal topics;
        receiving the raw external sensor data from the external sensor via the port subsequent to the subscribing; and
        routing the raw external sensor data, in accordance with the subscribing, from the external topic to at least the designated internal topic via the bridging service for processing into a processed sensor data stream.

17. The edge device of claim 16, wherein:
    the external topic is one of a plurality of external topics created in the external message broker, each of the plurality of external topics associated with receipt of respective raw external sensor data from a set of external sensors comprising the external sensor;
    the bridging service is one of a plurality of services running on the edge device to which the plurality of internal topics can be subscribed by the internal message broker; and
    the external broker is restricted to subscribing the plurality of external topics only to the bridging service.

18. The edge device of claim 16, the operations further comprising:
    opening the port as a write-only port,
    wherein the external sensor is coupled with the write-only port prior to the receiving the raw external sensor data.

19. The edge device of claim 16, the operations further comprising:
    receiving second messaging from the customer portal, the second messaging configuring a set of topic rules associated with the external topic; and
    pre-processing the raw external sensor data by the bridging service in accordance with the set of topic rules prior to the routing to at least the designated internal topic.

20. The edge device of claim 19, wherein:
    the pre-processing the raw external sensor data comprises transforming the raw sensor data into transformed sensor data by the bridging service in accordance with the set of topic rules.

21. The edge device of claim 20, wherein:
    the transforming comprises transforming the raw sensor data into a set of key-value pairs in accordance with the set of topic rules.

22. The edge device of claim 16, wherein:
    the bridging service is one of a plurality of services running on the edge device;
    the internal message broker maintains a list of subscriptions indicating which of the plurality of services is subscribed to each of the plurality of internal topics; and
    the subscribing comprises updating the list of subscriptions to indicate that the bridging service is subscribed to the designated internal topic.

23. The edge device of claim 22, the operations further comprising:
    performing anomaly detection on the processed sensor data stream by an anomaly detection service, the anomaly detection service being one of the plurality of services running on the edge device.

24. The edge device of claim 22, the operations further comprising:
    outputting the processed sensor data stream from the edge device by a data streamer service, the data streamer service being one of the plurality of services running on the edge device.

25. The edge device of claim 22, the operations further comprising:
    monitoring a present connectivity status of the external sensor by a sensor status service, the sensor status service being one of the plurality of services running on the edge device, being configured to detect whether a sensor is presently connected or disconnected from the edge device, and being subscribed to at least the designated internal topic and not to the external topic; and
    communicating the present connectivity status of the external sensor from the edge device to at least one of the one or more external computational systems.

26. The edge device of claim 16, the operations further comprising:
    receiving the raw internal sensor data from the one or more internal sensors directly via one or more of the plurality of internal topics without routing via the bridging service, the internal sensor data received concurrent with the receiving the raw external sensor data from the external sensor.

27. The edge device of claim 16, the operations further comprising:
    wirelessly pairing the external sensor with the port to establish a wireless communication link, the receiving the raw external sensor data being via the wireless communication link.

28. The edge device of claim 27, wherein:
    the external sensor is coupled via a wired connection with a wireless hub device; and
    the wirelessly pairing comprises wirelessly pairing the wireless hub device with the port to establish the wireless communication link, the wireless hub device configured to receive the raw external sensor data from the external sensor via the wired connection and to transmit the raw external sensor data wirelessly to port of the edge device via the wireless communication link.

29. The edge device of claim 28, wherein:
the external sensor is one of a moisture sensor or a current monitor, coupled with the wireless hub device via a standard headphone jack interface.

30. The edge device of claim 16, further comprising:
a network interface to communicatively couple the edge device with one or more external computational systems via one or more communication networks.

31. The edge device of claim 30, the operations further comprising:
outputting the processed sensor data stream to a data intake and query system via one of the one or more communication networks, the data intake and query system being one of the one or more external computational systems.

32. A non-transitory computer-readable medium having stored thereon instructions that, when executed by one or more processors, cause the one or more processors to implement an internal message broker, an external message broker, and a bridging service, and to perform operations comprising:
receiving first messaging from a customer portal, the first messaging requesting creation of an external topic in the external message broker, the external topic to receive raw external sensor data from an external sensor via a port,
wherein internal message broker has a plurality of internal topics not accessible via the customer portal, the internal topics preconfigured to receive raw internal sensor data from the one or more internal sensors;
instantiating the external topic in the external message broker responsive to the first messaging;
subscribing the bridging service to the external topic and to at least a designated internal topic of the plurality of internal topics;
receiving the raw external sensor data from the external sensor via the port subsequent to the subscribing;
routing the raw external sensor data, in accordance with the subscribing, from the external topic to at least the designated internal topic via the bridging service for processing into a processed sensor data stream; and
outputting the processed sensor data stream via a communication network.

33. The non-transitory computer-readable medium of claim 32, wherein:
the external topic is one of a plurality of external topics created in the external message broker, each of the plurality of external topics associated with receipt of respective raw external sensor data from a set of external sensors comprising the external sensor;
the bridging service is one of a plurality of services to which the plurality of internal topics can be subscribed by the internal message broker; and
the external broker is restricted to subscribing the plurality of external topics only to the bridging service.

34. The non-transitory computer-readable medium of claim 32, the operations further comprising:
opening the port as a write-only port,
wherein the external sensor is coupled with the write-only port prior to the receiving the raw external sensor data.

35. The non-transitory computer-readable medium of claim 32, the operations further comprising:
receiving second messaging from the customer portal, the second messaging configuring a set of topic rules associated with the external topic; and
pre-processing the raw external sensor data by the bridging service in accordance with the set of topic rules prior to the routing to at least the designated internal topic.

36. The non-transitory computer-readable medium of claim 32, wherein:
the bridging service is one of a plurality of services;
the internal message broker maintains a list of subscriptions indicating which of the plurality of services is subscribed to each of the plurality of internal topics; and
the subscribing comprises updating the list of subscriptions to indicate that the bridging service is subscribed to the designated internal topic.

37. The non-transitory computer-readable medium of claim 36, the operations further comprising:
performing anomaly detection on the processed sensor data stream by an anomaly detection service, the anomaly detection service being one of the plurality of services.

38. The non-transitory computer-readable medium of claim 36, wherein the outputting the processed sensor data stream is by a data streamer service, the data streamer service being one of the plurality of services.

39. The non-transitory computer-readable medium of claim 36, the operations further comprising:
monitoring a present connectivity status of the external sensor by a sensor status service, the sensor status service being one of the plurality of services, being configured to detect whether a sensor is presently connected or disconnected via the port, and being subscribed to at least the designated internal topic and not to the external topic.

40. The non-transitory computer-readable medium of claim 32, the operations further comprising:
receiving the raw internal sensor data from the one or more internal sensors directly via one or more of the plurality of internal topics without routing via the bridging service, the internal sensor data received concurrent with the receiving the raw external sensor data from the external sensor.

41. The non-transitory computer-readable medium of claim 32, the operations further comprising:
wirelessly pairing the external sensor with the port to establish a wireless communication link, the receiving the raw external sensor data being via the wireless communication link.

* * * * *